(12) United States Patent
Fujii et al.

(10) Patent No.: US 7,944,505 B2
(45) Date of Patent: *May 17, 2011

(54) IMAGE PROCESSING APPARATUS AND METHOD, INFORMATION PROCESSING APPARATUS AND METHOD, RECORDING MEDIUM, AND PROGRAM

(75) Inventors: Takeyuki Fujii, Tokyo (JP); Tetsujiro Kondo, Tokyo (JP); Kazutaka Ando, Kanagawa (JP); Naoki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 12/208,080

(22) Filed: Sep. 10, 2008

(65) Prior Publication Data

US 2009/0009663 A1    Jan. 8, 2009

Related U.S. Application Data

(62) Division of application No. 11/190,885, filed on Jul. 28, 2005, now Pat. No. 7,561,207.

(30) Foreign Application Priority Data

Aug. 2, 2004    (JP) ................................. 2004-225720

(51) Int. Cl.
*H04N 1/393* (2006.01)
*H04N 5/44* (2011.01)

(52) U.S. Cl. ........ 348/561; 348/581; 348/704; 382/298; 358/1.2

(58) Field of Classification Search .................. 348/561, 348/704, 581, 240.99, 576; 345/660, 472; 715/800, 815; 382/298, 299; 358/1.2, 451
See application file for complete search history.

(56) References Cited

U.S. PATENT DOCUMENTS

| | | | |
|---|---|---|---|
| 4,996,642 A | 2/1991 | Hey | |
| 6,542,201 B1 | 4/2003 | Song et al. | |
| 6,603,489 B1 | 8/2003 | Edlund et al. | |
| 6,643,416 B1 | 11/2003 | Daniels et al. | |
| 6,735,571 B2 | 5/2004 | Coleman et al. | |
| 7,058,708 B2 | 6/2006 | Gold et al. | |
| 7,107,491 B2 | 9/2006 | Graichen et al. | |
| 7,236,637 B2 | 6/2007 | Sirohey et al. | |
| 7,312,832 B2 | 12/2007 | Huang et al. | |
| 7,508,446 B2 * | 3/2009 | Kondo ........................ | 348/441 |
| 7,561,207 B2 * | 7/2009 | Fujii et al. ..................... | 348/561 |
| 2004/0233331 A1 | 11/2004 | Kondo | |
| 2006/0038920 A1 | 2/2006 | Kondo et al. | |

FOREIGN PATENT DOCUMENTS

| | | |
|---|---|---|
| CN | 1507745 A | 6/2004 |
| JP | 2789560 | 6/1998 |
| JP | 2003-224797 | 8/2003 |
| JP | 2004-191856 | 7/2004 |

OTHER PUBLICATIONS

Office Action issued Oct. 14, 2010, in Japan Patent Application No. 2004-225720.

* cited by examiner

*Primary Examiner* — Jefferey Harold
*Assistant Examiner* — Jean W Désir
(74) *Attorney, Agent, or Firm* — Oblon, Spivak, McClelland, Maier & Neustadt, L.L.P.

(57) ABSTRACT

An information processing apparatus includes storage means for storing an adjusted value previously set by a user for an output state of information and prediction means for predicting a prediction value for adjustment of the output state in accordance with the stored adjusted value.

8 Claims, 21 Drawing Sheets

FIG. 7A

2003/11/07 12:12:59 POWER ON
2003/11/07 12:13:00 CHANNEL 8
2003/11/07 12:23:02 CHANNEL 1
2003/11/07 12:33:04 ZOOM FACTOR 1.5
2003/11/07 13:23:23 NOISE REJECTION 15, RESOLUTION 10
2003/11/07 14:23:55 CHANNEL 8
2003/11/07 14:52:59 CHANNEL 1
2003/11/07 15:10:00 POWER OFF
2003/11/07 20:20:02 POWER ON
2003/11/07 20:25:04 CHANNEL 8
2003/11/07 20:45:23 ZOOM FACTOR 3.0
2003/11/07 22:23:55 NOISE REJECTION 80, RESOLUTION 50
2003/11/07 23:23:55 POWER OFF
2003/11/08 12:12:59 POWER ON
2003/11/08 12:13:00 CHANNEL 8
2003/11/08 12:23:02 CHANNEL 1
2003/11/08 12:33:04 ZOOM FACTOR 1.5
2003/11/08 13:23:23 NOISE REJECTION 43: RESOLUTION 100
2003/11/08 14:23:55 CHANNEL 8
2003/11/08 14:52:59 CHANNEL 1
2003/11/08 15:10:00 POWER OFF
2003/11/08 20:20:02 POWER ON
2003/11/08 20:25:04 CHANNEL 8
2003/11/08 20:45:23 ZOOM FACTOR 2.0
2003/11/08 22:23:55 NOISE REJECTION 53, RESOLUTION 150
2003/11/08 23:23:55 POWER OFF
2003/11/09 12:12:59 POWER ON
2003/11/09 12:13:00 CHANNEL 8
2003/11/09 12:23:02 CHANNEL 1
2003/11/09 12:33:04 ZOOM FACTOR 1.5
2003/11/09 13:23:23 NOISE REJECTION 53, RESOLUTION 10
2003/11/09 14:23:55 CHANNEL 8
2003/11/09 14:52:59 CHANNEL 1
2003/11/09 15:10:00 POWER OFF
2003/11/09 20:20:02 POWER ON
2003/11/09 20:25:04 CHANNEL 8
2003/11/09 20:45:23 ZOOM FACTOR 1.0
2003/11/09 22:23:55 NOISE REJECTION 53, RESOLUTION 50
2003/11/09 23:23:55 POWER OFF
2003/11/10 12:12:59 POWER ON
2003/11/10 12:13:00 CHANNEL 8
2003/11/10 12:23:02 CHANNEL 1
2003/11/10 12:33:04 ZOOM FACTOR 1.5
2003/11/10 13:23:23 NOISE REJECTION 43, RESOLUTION 100
2003/11/10 14:23:55 CHANNEL 8
2003/11/10 14:52:59 CHANNEL 1
2003/11/10 15:10:00 POWER OFF
2003/11/10 20:20:02 POWER ON
2003/11/10 20:25:04 CHANNEL 8
2003/11/10 20:45:23 ZOOM FACTOR 3.0

FIG. 7B

2003/11/07 12:12:59 POWER ON
2003/11/07 12:13:00 CHANNEL 8
2003/11/07 12:23:02 CHANNEL 1
2003/11/07 12:33:04 ZOOM FACTOR 1.5
2003/11/07 13:23:23 NOISE REJECTION 15, RESOLUTION 10
2003/11/07 14:23:55 CHANNEL 8
2003/11/07 14:52:59 CHANNEL 1
2003/11/07 15:10:00 POWER OFF
2003/11/07 20:20:02 POWER ON
2003/11/07 20:25:04 CHANNEL 8
2003/11/07 20:45:23 ZOOM FACTOR 3.0
2003/11/07 22:23:55 NOISE REJECTION 80, RESOLUTION 50
2003/11/07 23:23:55 POWER OFF
2003/11/08 12:12:59 POWER ON
2003/11/08 12:13:00 CHANNEL 8
2003/11/08 12:23:02 CHANNEL 1
2003/11/08 12:33:04 ZOOM FACTOR 1.5
2003/11/08 13:23:23 NOISE REJECTION 43: RESOLUTION 100
2003/11/08 14:23:55 CHANNEL 8
2003/11/08 14:52:59 CHANNEL 1
2003/11/08 15:10:00 POWER OFF
2003/11/08 20:20:02 POWER ON
2003/11/08 20:25:04 CHANNEL 8
2003/11/08 20:45:23 ZOOM FACTOR 2.0
2003/11/08 22:23:55 NOISE REJECTION 53, RESOLUTION 150
2003/11/08 23:23:55 POWER OFF
2003/11/09 12:12:59 POWER ON
2003/11/09 12:13:00 CHANNEL 8
2003/11/09 12:23:02 CHANNEL 1
2003/11/09 12:33:04 ZOOM FACTOR 1.5
2003/11/09 13:23:23 NOISE REJECTION 53, RESOLUTION 10
2003/11/09 14:23:55 CHANNEL 8
2003/11/09 14:52:59 CHANNEL 1
2003/11/09 15:10:00 POWER OFF
2003/11/09 20:20:02 POWER ON
2003/11/09 20:25:04 CHANNEL 8
2003/11/09 20:45:23 ZOOM FACTOR 1.0
2003/11/09 22:23:55 NOISE REJECTION 53, RESOLUTION 50
2003/11/09 23:23:55 POWER OFF
2003/11/10 12:12:59 POWER ON
2003/11/10 12:13:00 CHANNEL 8
2003/11/10 12:23:02 CHANNEL 1
2003/11/10 12:33:04 ZOOM FACTOR 1.5
2003/11/10 13:23:23 NOISE REJECTION 43, RESOLUTION 100
2003/11/10 14:23:55 CHANNEL 8
2003/11/10 14:52:59 CHANNEL 1
2003/11/10 15:10:00 POWER OFF
2003/11/10 20:20:02 POWER ON
2003/11/10 20:25:04 CHANNEL 8
2003/11/10 20:45:23 ZOOM FACTOR 3.0

IMAGE PROCESSING APPARATUS AND METHOD, INFORMATION PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2004-225720 filed in the Japanese Patent Office on Aug. 2, 2004, the entire contents of which are incorporated herein by reference.

BACKGROUND OF THE INVENTION

1. Field of the Invention

The present invention relates to information processing apparatuses and methods, recording media, and programs, and more particularly, to an information processing apparatus and method enabling a user to change setting for processing on an input signal, a recording medium, and a program.

2. Description of the Related Art

Recently, television receivers having a zoom function have been suggested. Such television receivers are capable of displaying images zoomed in or zoomed out to a magnification desired by a user.

When images are zoomed in or zoomed out, a modulation transfer function (MTF) also changes. Thus, a procedure for adjusting an MTF in accordance with a correction coefficient prepared based on a zoom-in factor or a zoom-out factor is suggested, for example, in Japanese Patent No. 2789560.

However, since the procedure described in Japanese Patent No. 2789560 adjusts an image quality in accordance with a correction coefficient determined directly and exclusively based on a magnification, it is difficult to provide an image with an image quality that suits a user's preference.

SUMMARY OF THE INVENTION

According to an embodiment of the present invention, an information processing apparatus includes storage means for storing an adjusted value previously set by a user for an output state of information and prediction means for predicting a prediction value for adjustment of the output state in accordance with the stored adjusted value.

The information processing apparatus may further include setting means. The storage means may store the adjusted value previously set by the user for each of a zoom factor and an image quality of an image. When the user designates a zoom factor, the prediction means may predict the prediction value for adjustment of the image quality corresponding to the designated zoom factor in accordance with the stored adjusted value. The setting means may set the designated zoom factor and the prediction value.

The prediction means may predict the prediction value by weighting the previously set adjusted value on the basis of a date.

The prediction means may predict the prediction value based on a primary approximate line in which the total sum of square errors with respect to adjusted values previously set by the user is the minimum.

The information processing apparatus may further include adjusting means for adjusting an adjustable range for the image quality such that the prediction value is located at the approximate center of the adjustable range.

The storage means may store a first adjusted value and a second adjusted value as adjusted values of the image quality. The prediction means may predict a prediction value of the first adjusted value and a prediction value of the second adjusted value corresponding to the designated zoom factor. The adjusting means may adjust the adjustable range for the image quality such that the prediction value of the first adjusted value is located at the approximate center of the adjustable range and that the prediction value of the second adjusted value is located at the approximate center of the adjustable range.

The first adjusted value and the second adjusted value may be a resolution and a degree of noise rejection, respectively, for resolution creation processing.

The information processing apparatus may further include adjusting means for adjusting an adjustable range for the output state such that the prediction value is located at the approximate center of the adjustable range.

The storage means may store a first adjusted value, a second adjusted value, and a third adjusted value set by the user. The prediction means may predict a prediction value of the second adjusted value and a prediction value of the third adjusted value when the first adjusted value is set. The adjusting means may adjust the adjustable range for the output state such that the prediction value of the second adjusted value is located at the approximate center of the adjustable range and that the prediction value of the third adjusted value is located at the approximate center of the adjustable range.

The information may include an image. The first adjusted value may include a zoom factor of the image. The second adjusted value may include a resolution of the image for resolution creation processing. The third adjusted value may include a degree of noise rejection of the image for the resolution creation processing.

According to an embodiment of the present invention, an information processing method includes the steps of storing an adjusted value previously set by a user for an output state of information and predicting a prediction value for adjustment of the output state in accordance with the stored adjusted value.

The information processing method may further include the step of setting a designated zoom factor and the prediction value. The adjusted value previously set by the user for each of a zoom factor and an image quality of an image may be stored by the storing step. When the user designates the zoom factor, the prediction value for adjustment of the image quality corresponding to the designated zoom factor may be predicted by the predicting step in accordance with the stored adjusted value.

The information processing method may further include the step of adjusting an adjustable range for the output state such that the prediction value is located at the approximate center of the adjustable range.

A first adjusted value, a second adjusted value, and a third adjusted value set by the user may be stored by the storing step. A prediction value of the second adjusted value and a prediction value of the third adjusted value when the first adjusted value is set may be predicted by the predicting step. The adjustable range for the output state may be adjusted by the adjusting step such that the prediction value of the second adjusted value is located at the approximate center of the adjustable range and that the prediction value of the third adjusted value is located at the approximate center of the adjustable range.

According to an embodiment of the present invention, a computer-readable program recorded on a recording medium includes the steps of storing an adjusted value previously set by a user for an output state of information and predicting a prediction value for adjustment of the output state in accordance with the stored adjusted value.

According to an embodiment of the present invention, a program causes a computer to perform processing including the steps of storing an adjusted value previously set by a user for an output state of information and predicting a prediction value for adjustment of the output state in accordance with the stored adjusted value.

According to an embodiment of the present invention, an information processing apparatus includes a storage unit storing an adjusted value previously set by a user for an output state of information and a prediction unit predicting a prediction value for adjustment of the output state in accordance with the stored adjusted value.

The information processing apparatus may further include a setting unit. The storage unit may store the adjusted value previously set by the user for each of a zoom factor and an image quality of an image. When the user designates a zoom factor, the prediction unit may predict the prediction value for adjustment of the image quality corresponding to the designated zoom factor in accordance with the stored adjusted value. The setting unit may set the designated zoom factor and the prediction value.

The information processing apparatus may further include an adjusting unit adjusting an adjustable range for the output state such that the prediction value is located at the approximate center of the adjustable range.

BRIEF DESCRIPTION OF THE DRAWINGS

FIG. 7A illustrates an example of accumulated data used in step S86 in FIG. 6;

FIG. 7B illustrates an example of accumulated data sorted out in step S86 in FIG. 6;

DESCRIPTION OF THE PREFERRED EMBODIMENTS

Embodiments of the present invention will be described with reference to the drawings.

Figure 1:
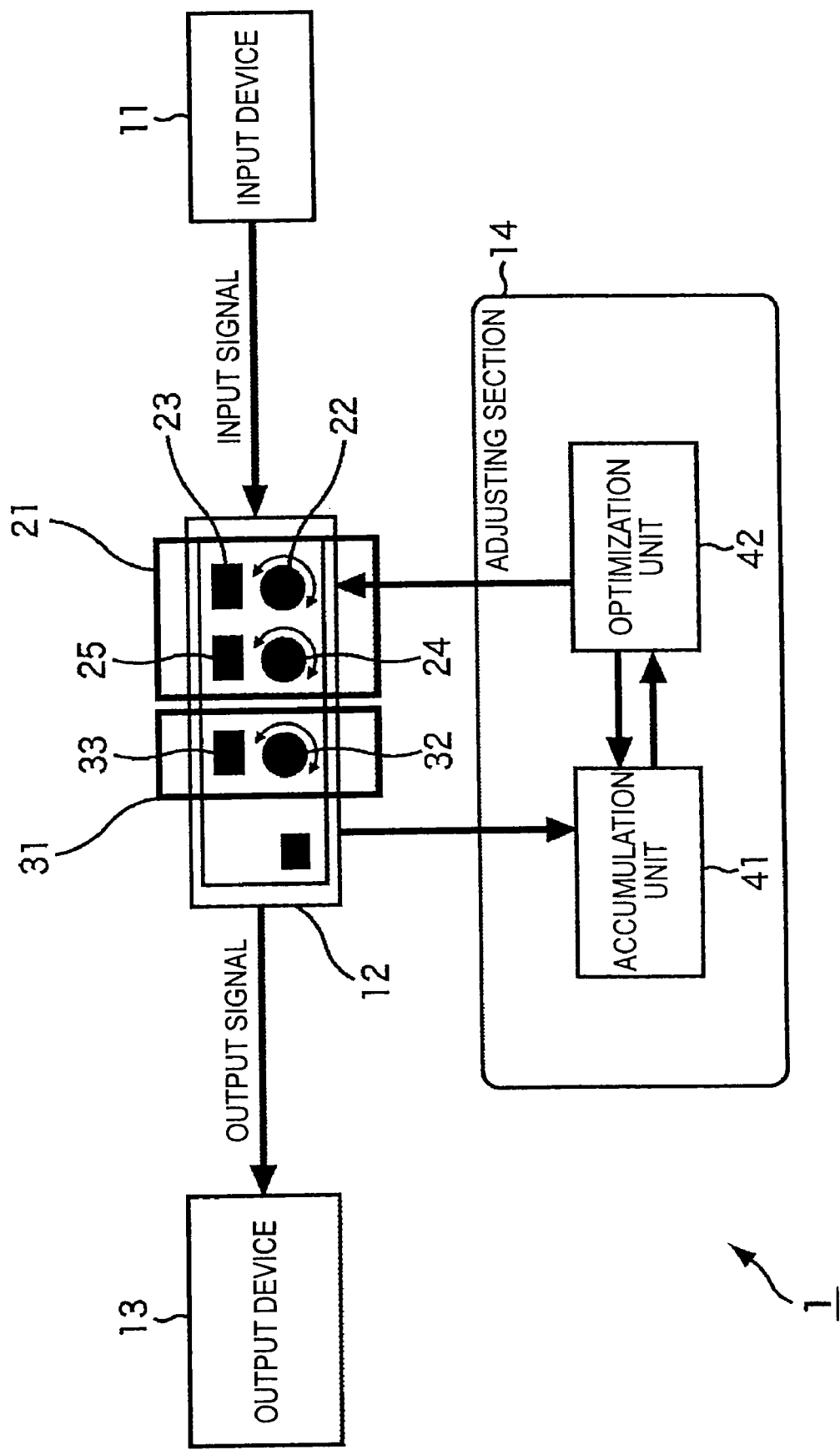
FIG. 1 is a block diagram showing an example of the structure of an image processing apparatus according to an embodiment of the present invention.

FIG. 1 shows an example of the principle structure of an image processing apparatus according to an embodiment of the present invention. An image processing apparatus 1 includes an input device 11, a changing section 12, an output device 13, and an adjusting section 14.

For example, the input device 11, such as a television tuner, inputs an image signal in a predetermined channel as an input signal to the changing section 12. The changing section 12 processes the input image signal, outputs the processed image signal as an output signal to the output device 13, and causes the output device 13 to display the processed image signal.

The changing section 12 includes an image quality changing unit 21 and a magnification changing unit 31. The image quality changing unit 21 includes knobs 22 and 24. A user adjusts resolution for time resolution creation processing to a predetermined value by turning the knob 22. The resolution set by adjusting the knob 22 is displayed on a display 23. Similarly, the user adjusts a degree of noise rejection (hereinafter, simply referred to as a noise rejection) for time resolution creation processing to a predetermined value by turning the knob 24, and the noise rejection set by adjusting the knob 24 is displayed on a display 25.

The magnification changing unit 31 includes a knob 32. A user adjusts a zoom factor to a predetermined value by turning the knob 32. The zoom factor set by adjusting the knob 32 is displayed on a display 33.

The adjusting section 14 includes an accumulation unit 41 and an optimization unit 42. The accumulation unit 41 accumulates, as records, adjusted values of a zoom factor, a resolution, and a noise rejection that are changed by the changing section 12. The optimization unit 42 predicts prediction values of resolution and noise rejection that are optimal for a zoom factor set by the user in accordance with the records accumulated in the accumulation unit 41, and outputs the prediction values to the changing section 12.

The operation of the image processing apparatus 1 according to this embodiment is described next. An image signal input from the input device 11 is supplied to the output device 13 via the changing section 12, and a corresponding image is displayed on the output device 13. The user views the image, and operates the knob 32 if the image needs to be zoomed in or zoomed out. Operating the knob 32 sets a zoom factor, and the set zoom factor is displayed on the display 33. The magnification changing unit 31 magnifies or reduces the size of the image for the image signal input from the input device 11 in accordance with the zoom factor designated by the user, and outputs a processed image signal to the output device 13. Thus, an image with the zoom factor set by the user is displayed on the output device 13.

Similarly, the user operates the knob 22 to designate a predetermined resolution, and operates the knob 24 to designate a desired noise rejection. The designated resolution and noise rejection are displayed on the displays 23 and 25, respectively. The image quality changing unit 21 performs time resolution creation processing for the image signal input from the input device 11 in accordance with the designated resolution and noise rejection. The image signal is changed to the zoom factor designated by the magnification changing unit 31, and the processed image signal is supplied to the output device 13. Thus, an image on which time resolution creation processing based on the resolution and noise rejection designated by the user is processed is displayed on the output device 13 with the zoom factor designated by the user.

The adjusted values of the zoom factor, the resolution, and the noise rejection that are designated by the user are accumulated as records in the accumulation unit 41. Thus, after the accumulation, when the user designates a predetermined zoom factor by operating the knob 32 of the magnification changing unit 31, a resolution and a noise rejection that are previously designated by the user for the designated zoom factor are predicted as optimal values (prediction values) by the optimization unit 42, and the predicted resolution and noise rejection are supplied to the image quality changing unit 21. The image quality changing unit 21 performs time resolution creation processing on the image signal input from the input device 11 in accordance with the resolution and the noise rejection supplied from the optimization unit 42, and outputs the processed image signal.

As described above, when once the user designates a preference by operating the knobs 22, 24, and 32, then image qualities (resolution and noise rejection) suited for the user's preference are automatically predicted only by designating a zoom factor, and an image with such image qualities is displayed.

Figure 2:
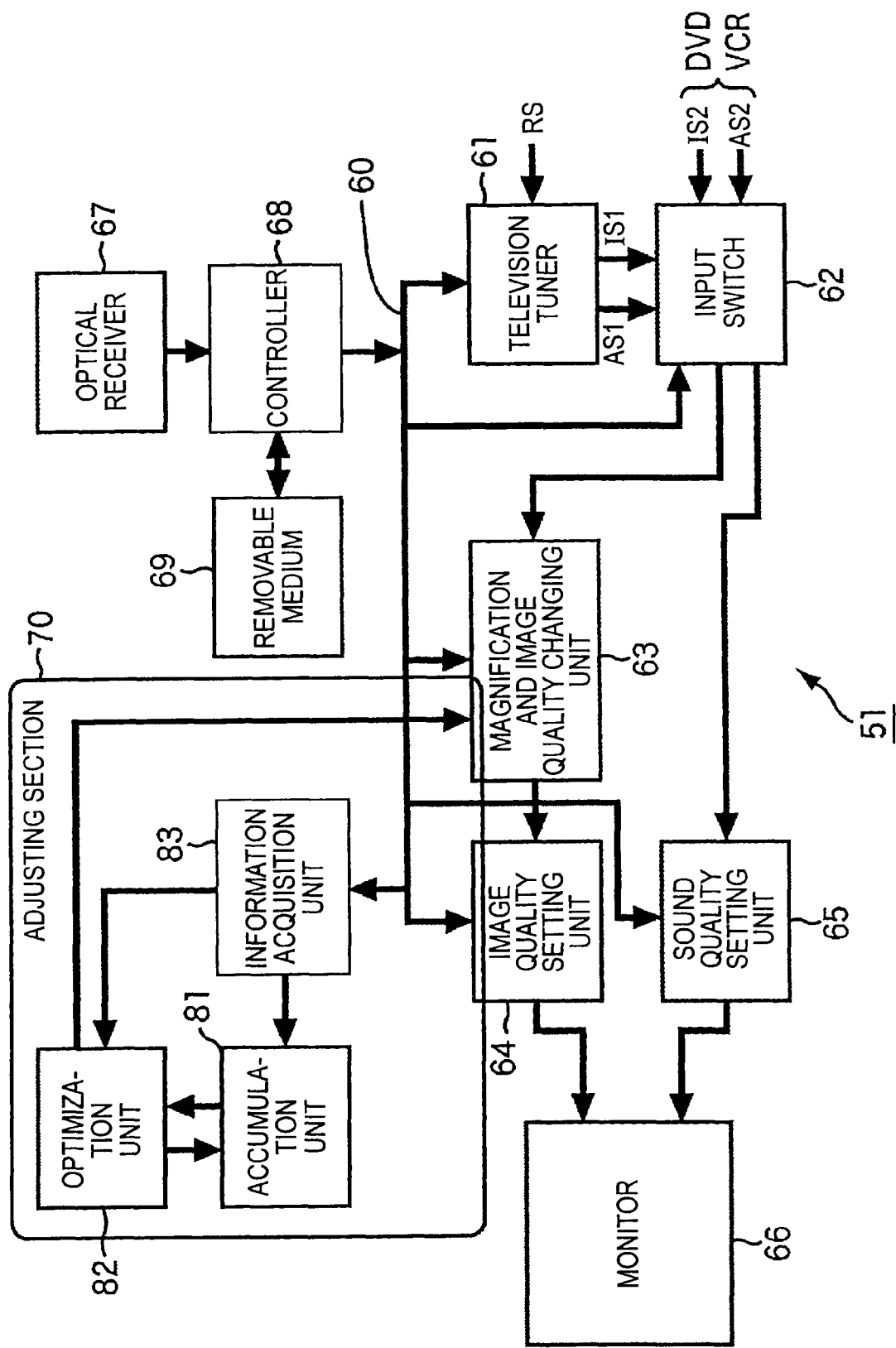
FIG. 2 is a block diagram showing an example of the structure of another image processing apparatus according to an embodiment of the present invention.

FIG. 2 shows an example of the structure of a television receiver functioning as an image processing apparatus according to an embodiment of the present invention. An image processing apparatus 51 includes a television tuner 61, an input switch 62, a magnification and image quality changing unit 63, an image quality setting unit 64, a sound quality setting unit 65, a monitor 66, an optical receiver 67, a controller 68, a removable medium 69, and an adjusting section 70. The adjusting section 70 includes an accumulation unit 81, an optimization unit 82, and an information acquisition unit 83. The component units are connected to each other via a bus 60 so that a necessary control command can be supplied to each unit.

The television tuner 61 demodulates a radio wave signal RS from ground waves, satellites, or the like received via an antenna (not shown), and outputs acquired image signal IS1 and audio signal AS1 to the input switch 62. The input switch 62 also receives an image signal IS2 and an audio signal AS2 output from a digital versatile disk (DVD), a video cassette recorder (VCR), or the like (not shown). The input switch 62 selects an image signal and an audio signal from a predetermined source from among input image signals and audio signals in accordance with an instruction from the controller 68. The input switch 62 supplies the selected image signal to the magnification and image quality changing unit 63, and outputs the selected audio signal to the sound quality setting unit 65.

The magnification and image quality changing unit 63 changes the magnification and image qualities of the input image signal in accordance with control commands from the controller 68, and outputs the processed image signal to the image quality setting unit 64. In other words, the magnification and image quality changing unit 63 has a function corresponding to that of the changing section 12 shown in FIG. 1. The magnification and image quality changing unit 63 changes settings for the zoom factor and the resolution and noise rejection for time resolution creation processing from among image qualities of the input image signal. The image quality setting unit 64 sets other image qualities, such as brightness, hue, and the like, which are not changed by the magnification and image quality changing unit 63. The image signal whose hue and brightness are adjusted by the image quality setting unit 64 is supplied to the monitor 66. The sound quality setting unit 65 adjusts the sound quality of the input audio signal in accordance with a control command from the controller 68, and outputs the processed audio signal to the monitor 66. The monitor 66 displays an image corresponding to the input image signal, and outputs sound corresponding to the input audio signal via a speaker contained in the monitor 66.

The controller 68 includes, for example, a microcomputer. The optical receiver 67 receives an infrared radiation signal from a remote controller (not shown), and outputs a signal corresponding to the received infrared radiation signal to the controller 68. The controller 68 generates a corresponding control command in accordance with the signal supplied from the optical receiver 67, and outputs the control command to each unit via the bus 60.

The information acquisition unit 83 of the adjusting section 70 includes, for example, a microcomputer. The information acquisition unit 83 controls the accumulation unit 81 and the optimization unit 82 in accordance with control commands received via the bus 60. The accumulation unit 81, which corresponds to the accumulation unit 41 in FIG. 1, accumulates a control command acquired via the information acquisition unit 83 as a record. When the user designates a zoom factor, the optimization unit 82, which corresponds to the optimization unit 42 in FIG. 1, predicts a resolution and a noise rejection that are optimal for the designated zoom factor as prediction values in accordance with, for example, zoom factors, resolutions, noise rejections, and channels accumulated in the accumulation unit 81, and outputs the prediction values to the magnification and image quality changing unit 63.

The removable medium 69 is installed when necessary, and supplies a program and the like recorded thereon to the controller 68.

Figure 3:
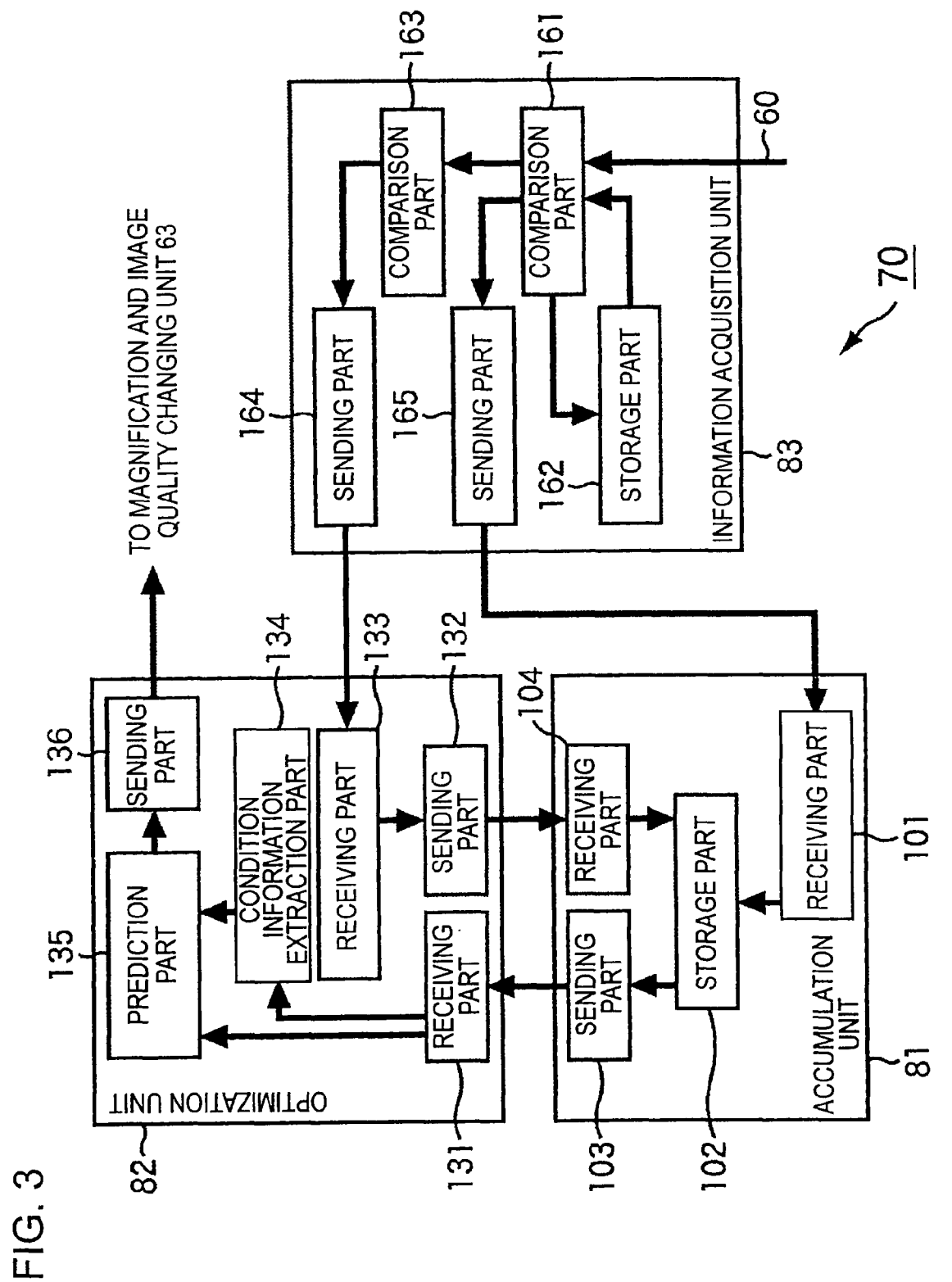
FIG. 3 is a block diagram showing an example of the functional structure of an adjusting section shown in FIG. 2.

FIG. 3 shows an example of the detailed structure of the accumulation unit 81, the optimization unit 82, and the information acquisition unit 83 of the adjusting section 70.

The accumulation unit 81 includes a receiving part 101, a storage part 102, a sending part 103, and a receiving part 104. The receiving part 101 receives a control command from a sending part 165 of the information acquisition unit 83, and supplies the received control command to the storage part 102 to be stored therein. The receiving part 104 receives a readout command from a sending part 132 of the optimization unit 82, and outputs the received readout command to the storage part 102. The sending part 103 outputs a control command read from the storage part 102 to a receiving part 131 of the optimization unit 82.

The optimization unit 82 includes the receiving part 131, the sending part 132, a receiving part 133, a condition information extraction part 134, a prediction part 135, and a sending part 136.

When receiving an optimization command output from a sending part 164 of the information acquisition unit 83, the receiving part 133 generates a readout command for reading control commands stored in the accumulation unit 81 in order to perform optimization processing corresponding to the optimization command, and outputs the generated readout command to the sending part 132. The sending part 132 outputs the readout command received from the receiving part 133 to the receiving part 104 of the accumulation unit 81. The receiving part 131 receives control commands supplied from the sending part 103 of the accumulation unit 81, and outputs the received control commands to the condition information extraction part 134 and the prediction part 135.

The condition information extraction part 134 extracts condition information included in the control commands read from the storage part 102 and supplied from the receiving part 131, and outputs the extraction result to the prediction part 135. The prediction part 135 predicts an optimal value as a prediction value corresponding to the condition extracted by the condition information extraction part 134 from the control commands input from the receiving part 131, and outputs the prediction value to the sending part 136. The sending part 136 outputs the prediction value supplied from the prediction part 135 to the magnification and image quality changing unit 63.

The information acquisition unit 83 includes a comparison part 161, a storage part 162, a comparison part 163, the sending part 164, and the sending part 165.

The comparison part 161 determines whether or not a control command supplied via the bus 60 is equal to a control command that is acquired last time and that is stored in the storage part 162. The storage part 162 temporarily stores a control command acquired via the bus 60 from the comparison part 161 in order to compare the control command with the next control command.

The comparison part 163 determines whether or not a control command supplied from the comparison part 161 is a magnification changing command. If the control command is a magnification changing command, the comparison part 163 generates an optimization command, and outputs the generated optimization command to the sending part 164. The sending part 164 outputs the optimization command supplied from the comparison part 163 to the receiving part 133 of the optimization unit 82.

The sending part 165 outputs a control command that is determined by the comparison part 161 to be different from the last control command to the receiving part 101 of the accumulation unit 81.

The operation of the image processing apparatus 51 shown in FIG. 2 is described next.

When the user operates a remote controller and instructs, for example, to receive a television broadcast in a predetermined channel, an infrared radiation signal corresponding to the instruction is received by the optical receiver 67, and a corresponding signal is supplied to the controller 68. The controller 68 outputs to the television tuner 61 via the bus 60 a control command to instruct to receive the broadcast in the predetermined channel in accordance with the received signal. When receiving the control command, the television tuner 61 receives a television broadcast signal for the designated channel, demodulates the television broadcast signal into an image signal and an audio signal, and outputs the demodulated image signal and audio signal to the input switch 62. Since reception of a television broadcast is instructed, the controller 68 outputs to the input switch 62 via the bus 60 a control command to select an output of the television tuner 61. The input switch 62 selects the image signal and the audio signal supplied from the television tuner 61 in accordance with the control command, supplies the image signal to the magnification and image quality changing unit 63, and outputs the audio signal to the sound quality setting unit 65.

If an instruction to change the magnification and image quality of the input image signal is not given, the magnification and image quality changing unit 63 outputs the input image signal to the image quality setting unit 64. The image quality setting unit 64 adjusts the brightness and hue of the image signal supplied from the magnification and image quality changing unit 63 to designated values in accordance with control commands supplied from the controller 68 via the bus 60, and outputs the processed image signal to the monitor 66. The sound quality setting unit 65 adjusts the sound quality of the audio signal supplied from the input switch 62 in accordance with a control command supplied from the controller 68, and outputs the processed audio signal to the monitor 66.

As described above, an image and sound of a television broadcast in a designated channel are output to the monitor 66.

When the user controls the remote controller to designate a zoom factor and resolution creation processing, the controller 68 controls the magnification and image quality changing unit 63 via the bus 60. The magnification and image quality changing unit 63 generates an image signal of an image zoomed in or zoomed out with the designated zoom factor in accordance with the control, and performs time resolution creation processing that satisfies the designated resolution and noise rejection. Thus, an image on which time resolution creation processing based on the resolution and noise rejection designated by the user is performed is displayed on the monitor 66 with the zoom factor designated by the user.

The foregoing processing is performed when the user designates a manual mode. In other words, time resolution creation processing is performed based on a resolution and a noise rejection designated by a user operation using a remote controller.

Control commands for a zoom factor, a resolution, a noise rejection, and a channel in this case are acquired by the information acquisition unit 83 monitoring the bus 60, supplied to the accumulation unit 81, and stored in the storage part 102 of the accumulation unit 81 as records.

In contrast, in a case where the user designates an automatic mode, when the user designates a zoom factor, optimal values of resolution and noise rejection that are previously designated by the user for the designated zoom factor are predicted, and the resolution and the noise rejection are automatically set as prediction values. A case where the user designates the automatic mode will be described below.

Figure 4:
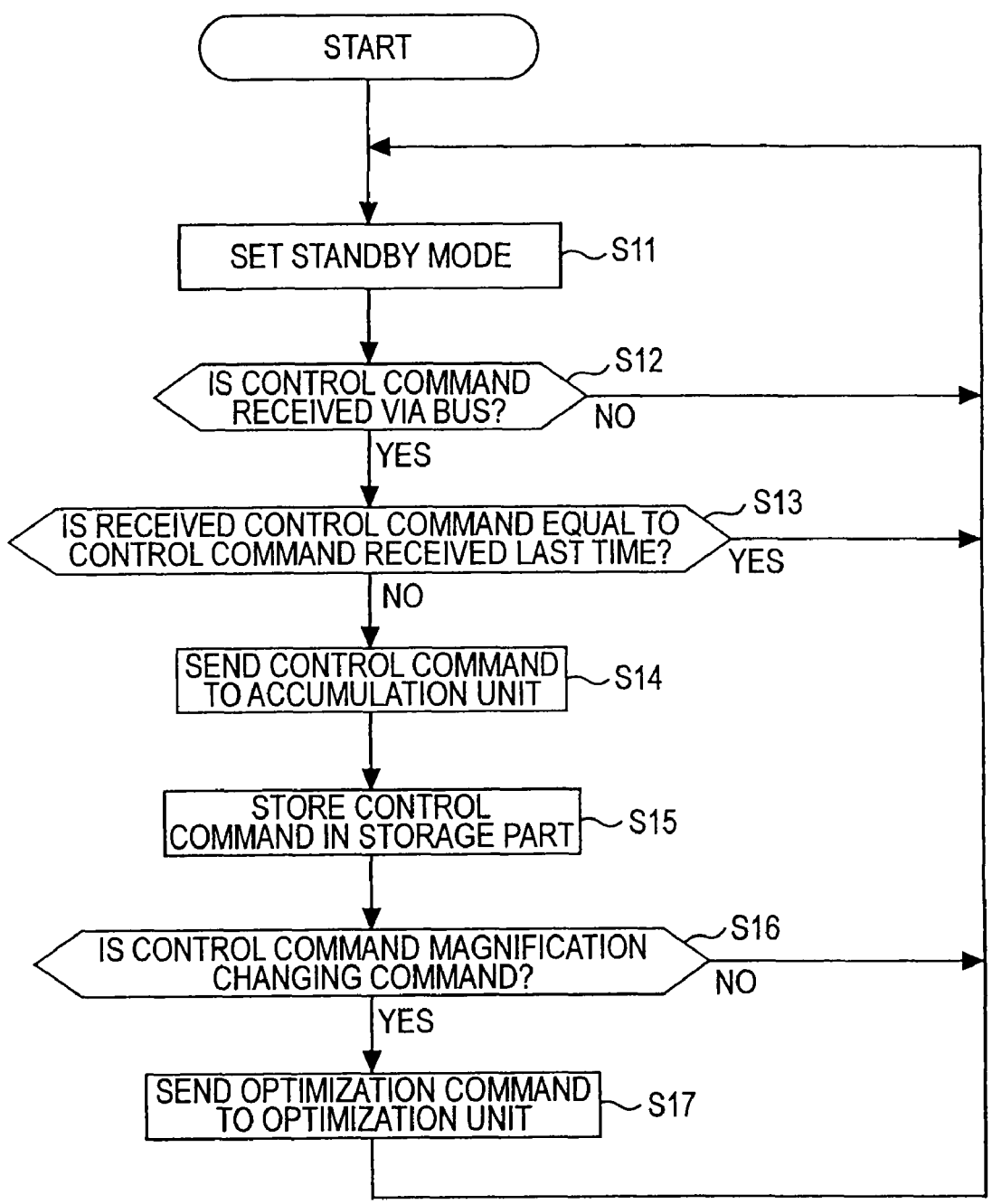
FIG. 4 is a flowchart of an information acquisition process performed by an information acquisition unit shown in FIG. 3.

FIG. 4 shows an information acquisition process performed by the information acquisition unit 83. In step S11, the comparison part 161 sets a standby mode. In step S12, the comparison part 161 determines whether or not a control command is received via the bus 60. If a control command is not received, the process returns to step S11, and the subsequent processing is repeatedly performed. If it is determined in step S12 that a control command is received via the bus 60, the comparison part 161 determines whether or not the received control command is equal to a control command acquired last time in step S13. More specifically, the comparison part 161 monitors the bus 60, and if a new control command is received, the comparison part 161 supplies the new control command to the storage part 162 to be stored therein (this processing corresponds to processing in step S15 described below). Thus, the control command acquired last time is stored in the storage part 162. The comparison part 161 compares the control command received at this time with the control command acquired last time and stored in the storage part 162, and determines whether or not both the control commands are equal to each other. If both the control commands are equal to each other, the control command received at this time does not need to be stored. Thus, the process returns to step S11, and the subsequent processing is repeatedly performed.

If it is determined in step S13 that the control command received at this time is not equal to the control command acquired last time, since the control command received at this time is a new control command, the sending part 165 sends the control command received at this time to the accumulation unit 81 in step S14. In other words, if a control command received at this time is different from a control command acquired last time, the comparison part 161 outputs the control command received at this time, which is a new control command, to the sending part 165. Then, the sending part 165 sends the new control command supplied from the comparison part 161 to the receiving part 101 of the accumulation unit 81. The control command is stored as a record in the storage part 102 of the accumulation unit 81 by processing in step S54 in FIG. 5, which will be described below.

In step S15, the comparison part 161 supplies the control command received at this time to the storage part 162 to be stored therein. In step S16, the comparison part 163 determines whether or not the control command is a magnification changing command. In other words, since the comparison part 161 outputs an acquired control command to the comparison part 163, the comparison part 163 determines whether or not the control command is a magnification changing control. If the control command is not a magnification changing command (if the control command is not a command for changing a zoom factor), optimization processing is not needed. Thus, the process returns to step S11, and the subsequent processing is repeatedly performed.

If it is determined in step S16 that the control command is a magnification changing command, the sending part 164 sends an optimization command to the optimization unit 82 in step S17. In other words, if the control command is a magnification changing command, the comparison part 163 generates a command for performing optimization, and outputs the optimization command to the sending part 164. The sending part 164 outputs the optimization command to the receiving part 133 of the optimization unit 82. The optimization command is received by the receiving part 133 of the optimization unit 82 by processing in step S82 in FIG. 6, which will be described below, and optimization processing is performed in accordance with the optimization command.

After the processing in step S17, the process returns to step S11, and the subsequent processing is repeatedly performed.

Figure 5:
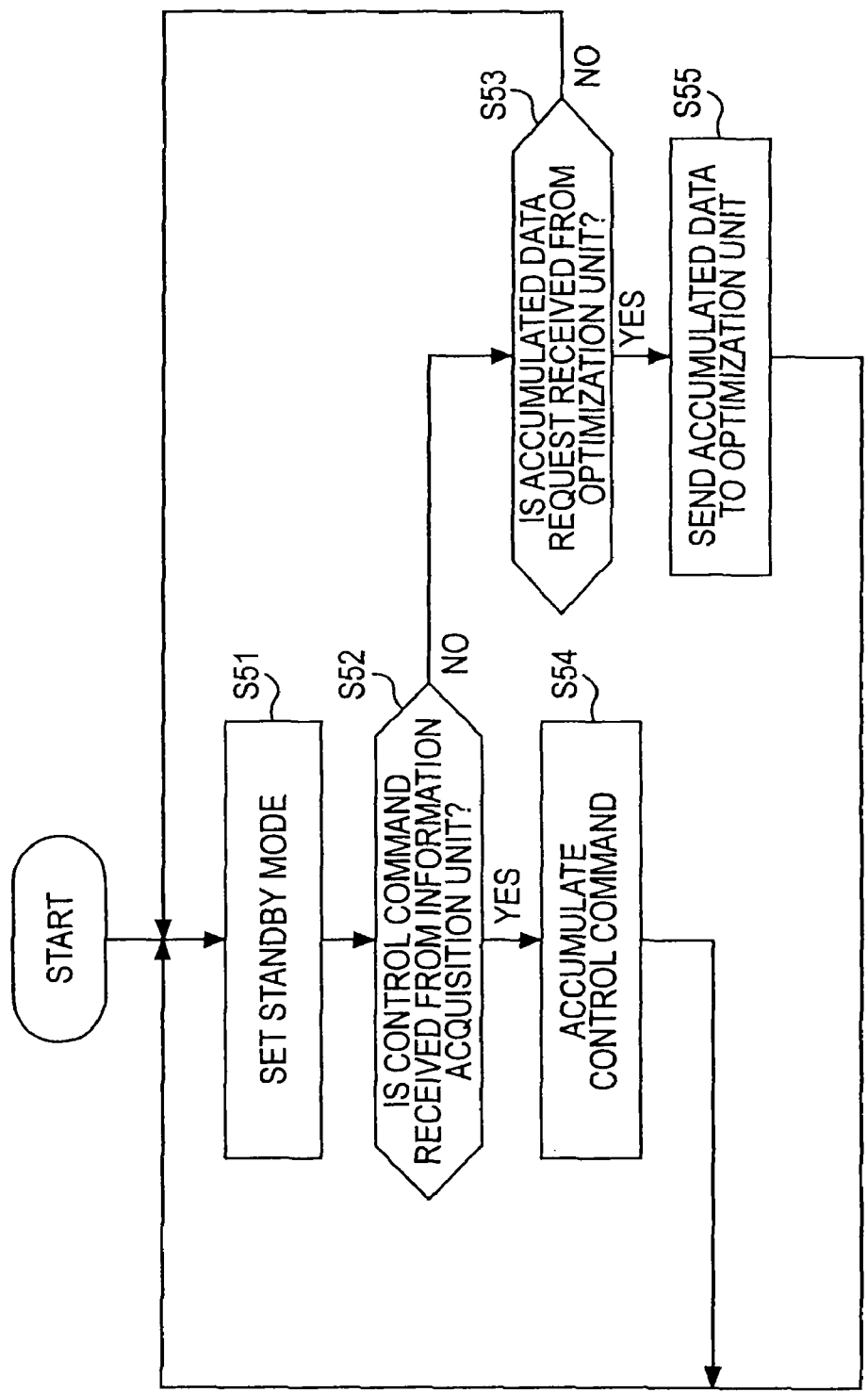
FIG. 5 is a flowchart of an accumulation process performed by an accumulation unit shown in FIG. 3.

The accumulation unit 81 performs an accumulation process shown by the flowchart in FIG. 5 so as to correspond to the information acquisition process shown by the flowchart in FIG. 4 performed by the information acquisition unit 83.

In other words, in step S51, the storage part 102 sets a standby mode. In step S52, the storage part 102 determines whether or not a control command is received from the information acquisition unit 83. In other words, when the sending part 165 of the information acquisition unit 83 sends a control command to the accumulation unit 81 in step S14 in FIG. 4, the receiving part 101 of the accumulation unit 81 receives the control command, and outputs the control command to the storage part 102. The storage part 102 determines whether or not the control command is received from the information acquisition unit 83 via the receiving part 101. If the control command is received from the information acquisition unit 83, the storage part 102 accumulates the control command in step S54. Thus, the control command is accumulated as a record in the storage part 102. Then, the process returns to step S51.

If it is determined in step S52 that the control command is not received from the information acquisition unit 83, the storage part 102 determines whether or not an accumulated data request is received from the optimization unit 82 in step S53. In other words, as described below with reference to the flowchart shown in FIG. 6, when receiving an optimization command from the information acquisition unit 83, the optimization unit 82 sends a request for reading control commands stored as records in the storage part 102 (this processing corresponds to processing in step S83 in FIG. 6). If the request is not received, the process returns to step S51, and the subsequent processing is repeatedly performed.

If it is determined in step S53 that an accumulated data request is received from the optimization unit 82, the storage part 102 sends accumulated data to the optimization unit 82 in step S55. More specifically, when an accumulated data request is sent from the sending part 132 of the optimization unit 82, the sent request is received by the receiving part 104 and supplied to the storage part 102. When receiving the request, the storage part 102 reads control commands (accumulated data) stored as records, and outputs the accumulated data to the sending part 103. The sending part 103 outputs the accumulated data to the receiving part 131 of the optimization unit 82.

Then, the process returns to step S51, and the subsequent processing is repeatedly performed.

As described above, when receiving a new control command from the information acquisition unit 83, the accumulation unit 81 stores the new control command in the storage part 102. In addition, when an instruction to read the control command is given from the optimization unit 82, the accumulation unit 81 reads the control command and outputs the read control command to the optimization unit 82.

Figure 6:
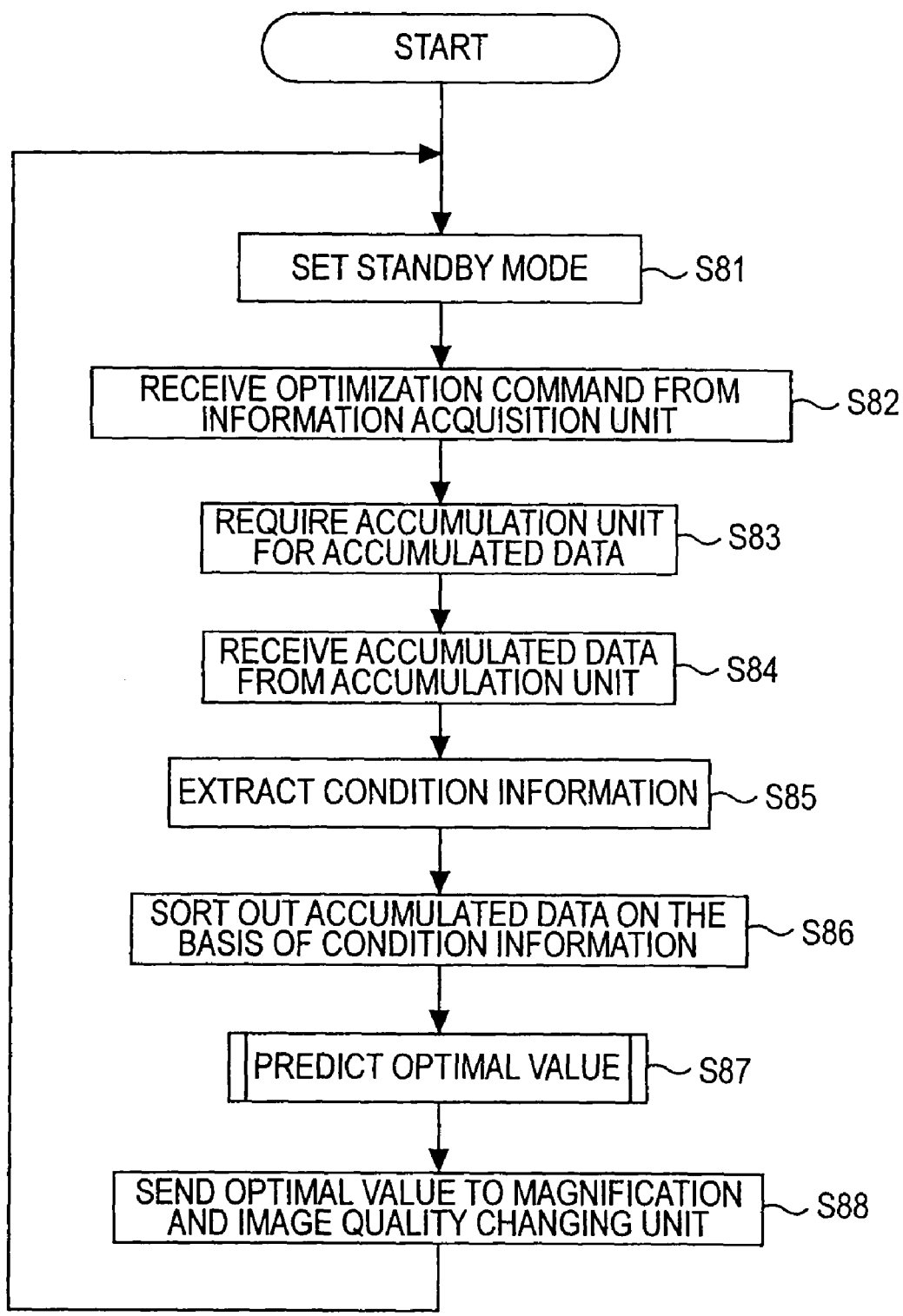
FIG. 6 is a flowchart of an optimization process performed by an optimization unit shown in FIG. 3.
Figure 8:
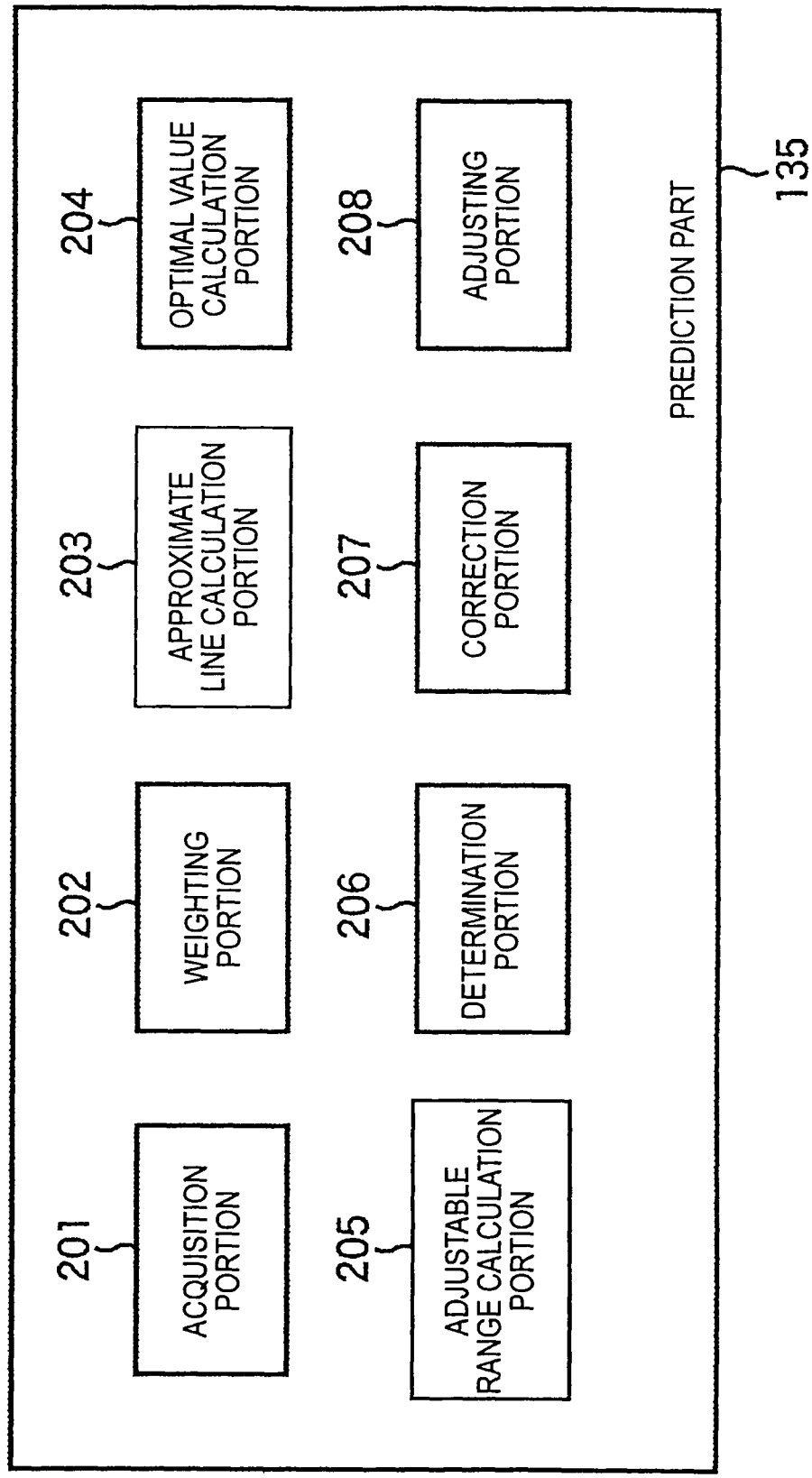
FIG. 8 is a block diagram showing an example of the functional structure of a prediction part shown in FIG. 3.

The optimization unit 82 performs an optimization process shown by the flowchart in FIG. 6 so as to correspond to the processing performed by the information acquisition unit 83 and the accumulation unit 81.

In other words, in step S81, the prediction part 135 sets a standby mode. In step S82, the receiving part 133 receives an optimization command from the information acquisition unit 83. (If the receiving part 133 does not receive an optimization command, the receiving part 133 waits until receiving an optimization command.) In other words, as described above, when the sending part 164 of the information acquisition unit 83 sends an optimization command in step S17 in FIG. 4, the receiving part 133 receives the optimization command. In step S83, the sending part 132 requires the accumulation unit 81 to send accumulated data. In other words, when receiving the optimization command, the receiving part 133 generates an instruction for requiring reading of accumulated data (control commands accumulated as records) in accordance with the received optimization command, and causes the sending part 132 to output the instruction to the receiving part 104 of the accumulation unit 81. As described above, when receiving the accumulated data request, the storage part 102 of the accumulation unit 81 reads stored accumulated data and sends the read accumulated data via the sending part 103 in step S55 in FIG. 5. In step S84, the receiving part 131 receives the accumulated data sent from the accumulation unit 81. The receiving part 131 outputs the received accumulated data to the condition information extraction part 134 and the prediction part 135.

In step S85, the condition information extraction part 134 extracts condition information from the accumulated data (control commands) supplied from the receiving part 131. For example, a channel being viewed by the user serves as condition information. If the user is viewing a television broadcast on "channel 8", the condition information extraction part 134 determines whether or not "channel 8" is included in the accumulated data. If "channel 8" is included in the accumulated data, "channel 8" is extracted as condition information. The extracted condition information is supplied to the prediction part 135. If "channel 8" is not included in the accumulated data, the condition information extraction part 134 selects another type of condition information.

In step S86, the prediction part 135 sorts out the accumulated data on the basis of the condition information. In other words, the prediction part 135 selects accumulated data corresponding to the condition information from among the accumulated data (control commands) read from the accumulation unit 81 and supplied from the receiving part 131. In this case, only accumulated data related to "channel 8" is selected.

FIGS. 7A and 7B show an example of the processing performed in this case. The prediction part 135 selects control commands for "channel 8" enclosed by landscape rectangles in FIG. 7B from among the accumulated data (control commands) shown in FIG. 7A read from the storage part 102. In this example, the zoom factor, the resolution, and the noise rejection for "channel 8" are selected.

In step S87, the prediction part 135 predicts optimal values in accordance with the accumulated data selected by the processing in step S86. The details of the optimal value prediction processing will be described below with reference to the flowchart shown in FIG. 9. By this processing, a resolution and a noise rejection that are previously designated the most times for a zoom factor with which the user is viewing (or a resolution and a noise rejection nearest to the resolution and the noise rejection that are previously designated the most times for the zoom factor with which the user is viewing) are predicted as optimal values (prediction values).

In step S88, the prediction part 135 sends to the magnification and image quality changing unit 63 the optimal values predicted by the processing in step S87. When receiving the resolution and the noise rejection as the optimal values, the magnification and image quality changing unit 63 performs time resolution creation processing in accordance with the received resolution and noise rejection. As a result, time resolution creation processing based on the values optimal for the zoom factor designated by the user (the resolution and the noise rejection that are previously designated by the user the most times for the zoom factor) is performed. In other words, when the user designates a zoom factor, a resolution and a noise rejection optimal for the designated zoom factor are automatically set.

Then, the process returns to step S81, and the subsequent processing is repeatedly performed.

The optimal value prediction processing performed in step S87 in FIG. 6 is described next.

In order to perform the prediction processing, the prediction part 135 includes an acquisition portion 201, a weighting portion 202, an approximate line calculation portion 203, an optimal value calculation portion 204, an adjustable range calculation portion 205, a determination portion 206, a correction portion 207, and an adjusting portion 208.

The acquisition portion 201 acquires preference data (in this case, resolution and noise rejection) for each zoom factor from among the data sorted out by the processing in step S86 in FIG. 6. The term "preference data" means data representing the degree of processing set by the user for an input signal. The weighting portion 202 weights the preference data acquired by the acquisition portion 201 on the basis of the date. The approximate line calculation portion 203 calculates a primary approximate line in which the total sum of square errors with respect to the preference data weighted by the weighting portion 202 is the minimum. The optimal value calculation portion 204 calculates optimal values of preference data for a zoom factor designated by the user.

The adjustable range calculation portion 205 calculates an adjustable range of a preference space in which the optimal values calculated by the optimal value calculation portion 204 are located at the approximate center of the adjustable range. The determination portion 206 determines a user's intention, determines whether or not a preference space calculated by the adjustable range calculation portion 205 is within the maximum preference space prepared in advance, and determines whether or not the total sum of square errors calculated by the approximate line calculation portion 203 is smaller than a threshold value set in advance. The correction portion 207 corrects the adjustable range so that the preference space calculated by the adjustable range calculation portion 205 can be accommodated within the maximum preference space prepared in advance. The adjusting portion 208 adjusts the adjustable range of the preference space.

The optimal value prediction process performed in step S87 in FIG. 6 is described next with reference to the flowchart shown in FIG. 9.

In step S111, the acquisition portion 201 acquires preference data (resolution and noise rejection) for each zoom factor from among the accumulated data selected in step S86 in FIG. 6 in accordance with the condition information. In step S112, the weighting portion 202 weights the preference data on the basis of the date. A larger weight is assigned for newer data. For example, 1.0-fold weighting is executed on preference data generated on a date less than one month before the current date, 0.8-fold weighting is executed on preference data generated on a date within a range of one month to less than three months before the current date, 0.6-fold weighting is executed on preference data generated on a date within a range of three months to less than six months before the current date, 0.4 weighting is executed on preference data generated on a date within a range of six months to less than twelve months before the current date, and 0.2-fold weighting is executed on preference data generated on a date more than or equal to twelve months before the current date. The user's preference changes in accordance with time. Thus, weighting is executed such that the latest user's preference is prioritized. In step S113, the approximate line calculation portion 203 calculates a primary approximate line in which the total sum of square errors with respect to the weighted preference data is the minimum and the total sum of square errors between the primary approximate line and the weighted preference data.

In step S114, the determination portion 206 determines a user's intention in accordance with a user input at that time. In other words, the determination portion 206 determines whether the user desires automatic prediction of preference data, the user desires customization of a preference space (customization of a possible range of user inputs), or the user does not desire anything. If the user desires automatic prediction of preference data, prediction procedure 1 is performed in step S115. The detailed description of prediction procedure 1 will be given below with reference to the flowchart shown in FIG. 10. If the user desires customization of a preference space, the determination portion 206 determines whether or not the total sum of the square errors calculated in step S113 (hereinafter until the description with reference to FIG. 18, simply referred to as a square error) is smaller than a threshold value TH set in advance in step S116. The threshold value TH set in advance may change in accordance with the number of pieces of accumulated preference data. If the square error is smaller than the threshold value TH, prediction procedure 3 is performed in step S117. The detailed description of prediction procedure 3 will be given below with reference to the flowchart shown in FIG. 18.

If it is determined in step S116 that the square error is not smaller than the threshold value TH (if it is determined in step S116 that the square error is more than or equal to the threshold value TH), the process proceeds to step S119 to perform prediction procedure 2. The detailed description of prediction procedure 2 will be given below with reference to the flowchart shown in FIG. 13.

If it is determined in step S114 that the user does not desire automatic prediction of preference data or customization of a preference space, that is, if it is determined in step S114 that the user does not desire anything, the determination portion 206 determines whether or not the square error is smaller than the threshold value TH in step S118. If it is determined that the square error is smaller than the threshold value TH, prediction procedure 1 is performed in step S115. In contrast, if it is determined that the square error is more than or equal to the threshold value TH, prediction procedure 2 is performed in step S119.

In other words, in a case where the square error is smaller than the threshold value TH, prediction procedure 3 is advantageous over prediction procedure 2 and prediction procedure 1 is advantageous over prediction procedure 2. Thus, the foregoing processing is performed.

The process of prediction procedure 1 will now be described with reference to the flowchart shown in FIG. 10.

Figure 11:
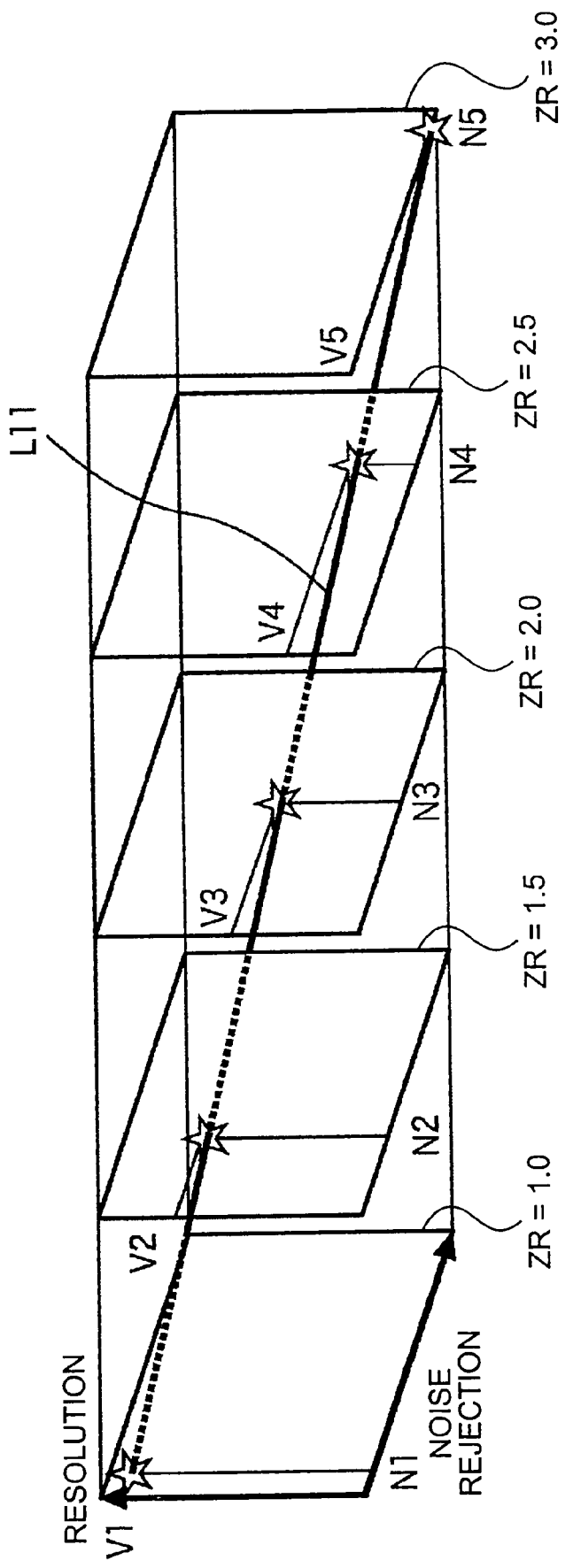
FIG. 11 is an illustration for explaining a primary approximate line.

In step S231, the approximate line calculation portion 203 calculates a primary approximate line having the minimum square error. In other words, for example, as shown in FIG. 11, when the zoom factor ZR is 1.0, n1 pieces of data each including a pair of noise rejection and resolution that are previously set by the user are acquired. Similarly, n2 pieces of data are acquired when the zoom factor ZR is 1.5, n3 pieces of data are acquired when the zoom factor ZR is 2.0, n4 pieces of data are acquired when the zoom factor ZR is 2.5, and n5 pieces of data are acquired when the zoom factor ZR is 3.0. In this case, n1+n2+n3+n4+n5 pieces of data are acquired in total.

Figure 9:
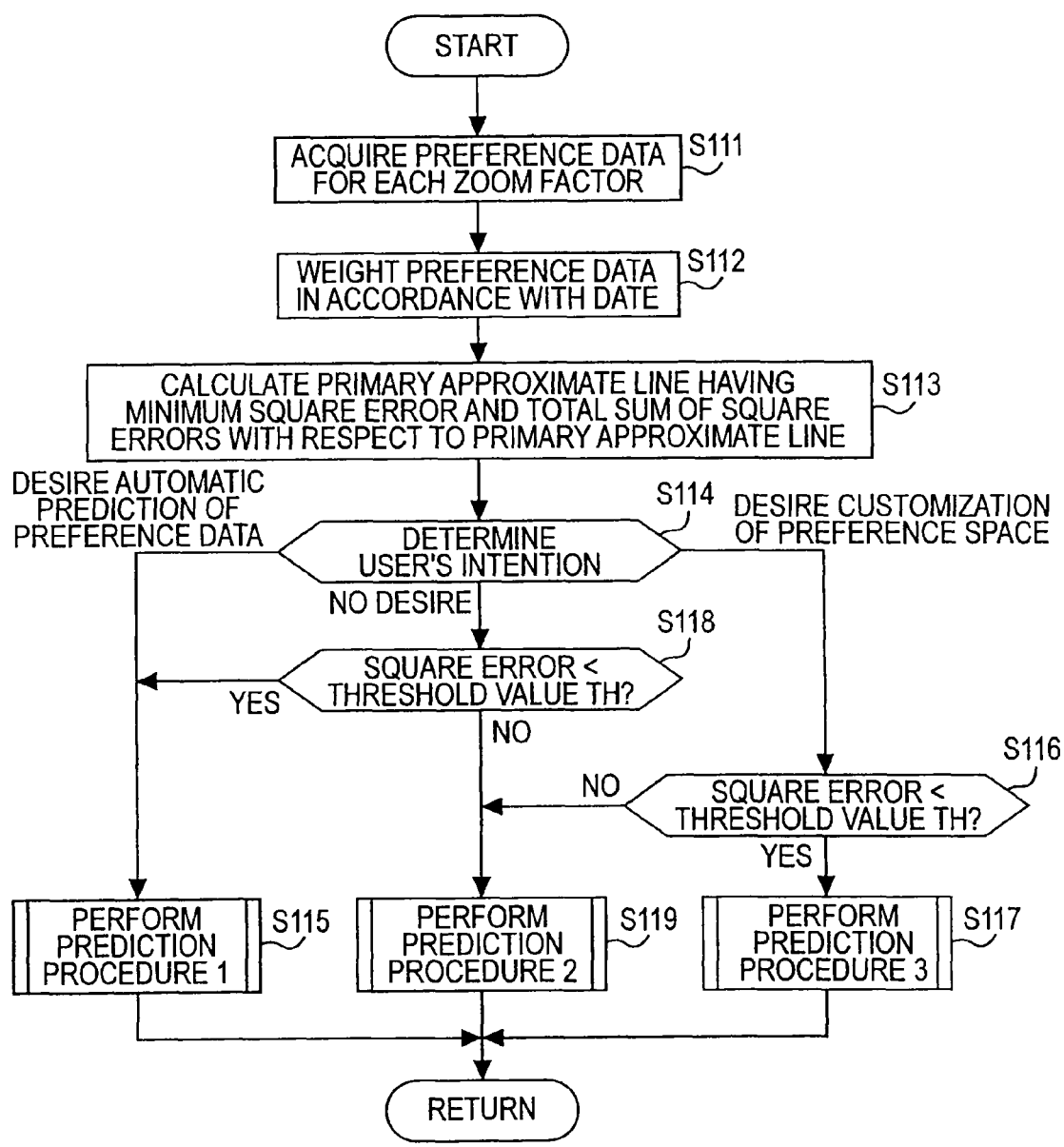
FIG. 9 is a flowchart of an optimal value prediction process in step S87 in FIG. 6.

Here, preference data is weighted in accordance with the date, as in the processing in step S112 in FIG. 9. Then, a line L11 in which the square error with respect to the weighted data is the minimum is calculated, as in the processing in step S113 in FIG. 9. As a result of the calculation, in the example shown in FIG. 11, the line L11 passes through a point at which the noise rejection is N1 and the resolution is V1 when the zoom factor ZR is 1.0, a point at which the noise rejection is N2 and the resolution is V2 when the zoom factor ZR is 1.5, a point at which the noise rejection is N3 and the resolution is V3 when the zoom factor ZR is 2.0, a point at which the noise rejection is N4 and the resolution is V4 when the zoom factor ZR is 2.5, and a point at which the noise rejection is N5 and the resolution is V5 when the zoom factor ZR is 3.0.

Figure 10:
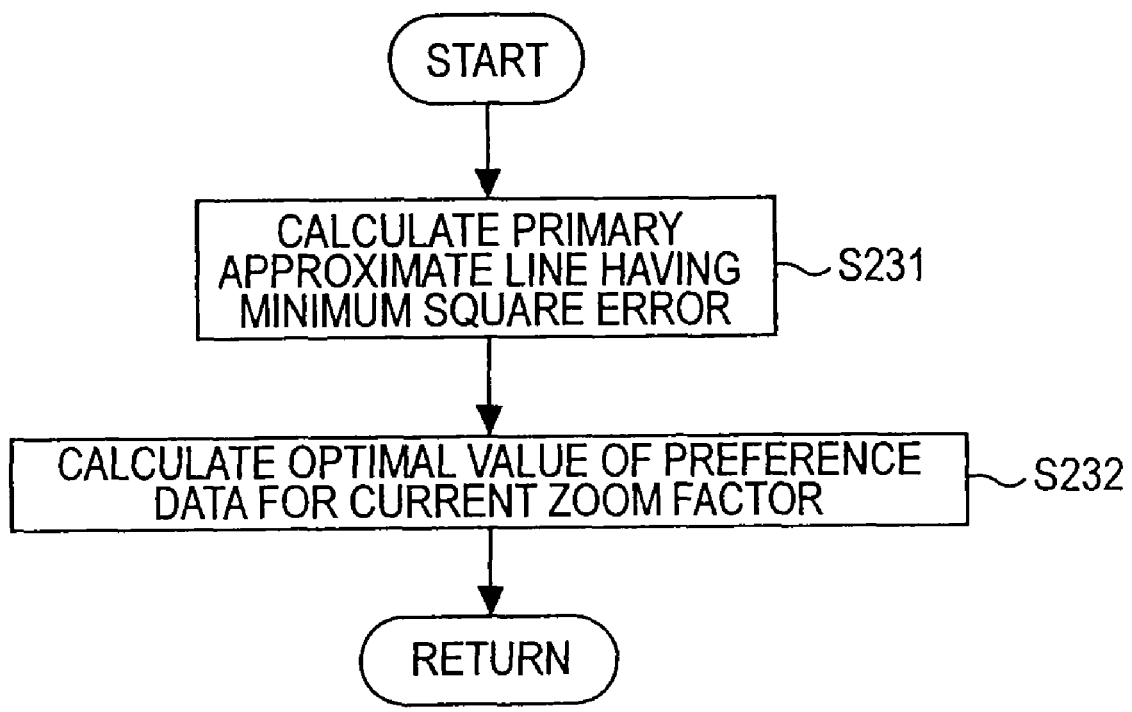
FIG. 10 is a flowchart of a process of prediction procedure 1 in step S115 in FIG. 9.

Since the processing in step S231 in FIG. 10 is equal to the processing in steps S111 to S113 in FIG. 9, the processing in step S231 may be omitted.

Figure 12:
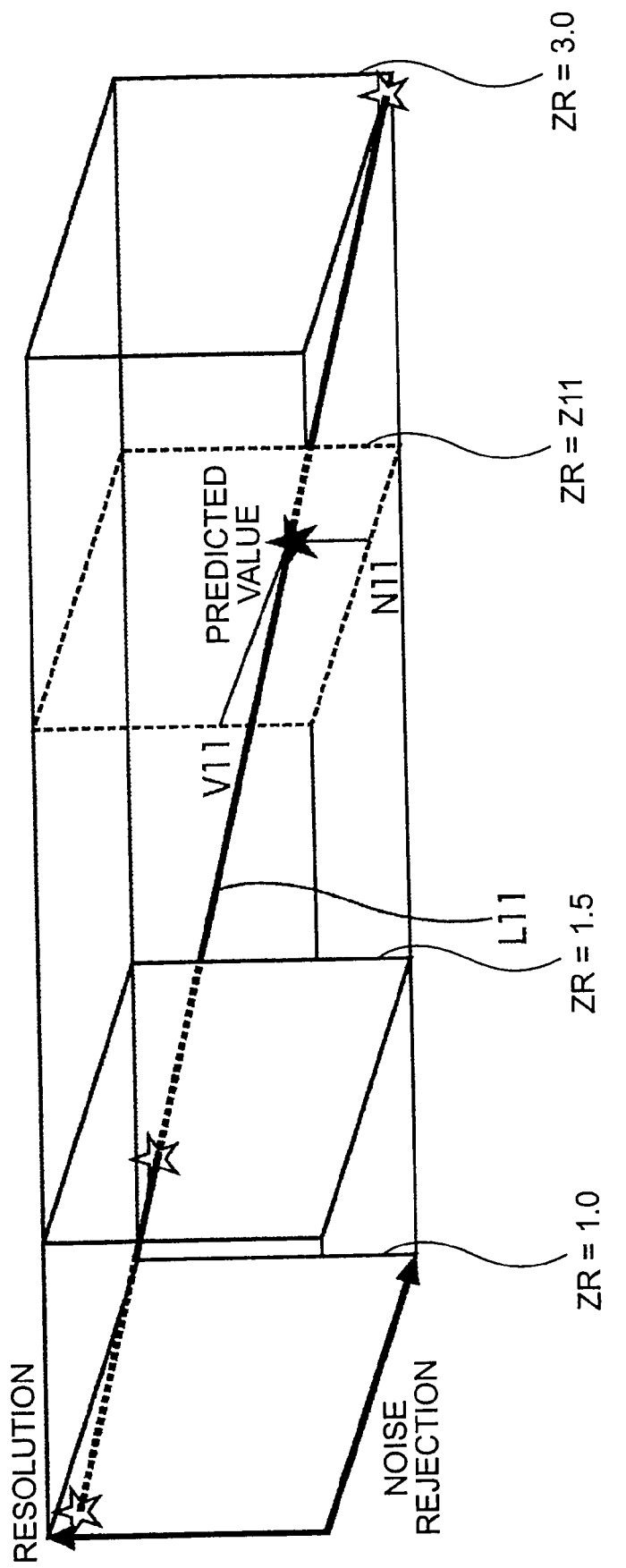
FIG. 12 is an illustration for explaining processing for calculating optimal values using the primary approximate line in step S232 in FIG. 10.

Then, in step S232, the optimal value calculation portion 204 calculates optimal values of preference data for the current zoom factor ZR. In other words, optimal values of preference data for the current zoom factor ZR are calculated in accordance with the primary approximate line calculated in step S231. FIG. 12 shows the principle for calculating optimal values. When the primary approximate line L11 is acquired as shown in FIG. 11, the noise rejection and the resolution when the current zoom factor ZR is Z11 can be calculated by setting up and solving a linear equation in accordance with the line L11 and the zoom factor Z11, as shown in FIG. 12. In the example shown in FIG. 12, since the line L11 intersects a coordinate point defined by the noise rejection N11 and the resolution V11, the noise rejection N11 and the resolution V11 are predicted as optimal values.

For prediction procedure 1, the noise rejection N11 and the resolution V11 acquired as prediction values are sent to the magnification and image quality changing unit 63, and time resolution creation processing is performed based on the prediction values.

The process of prediction procedure 2 will now be described with reference to the flowchart shown in FIG. 13.

Figure 14:
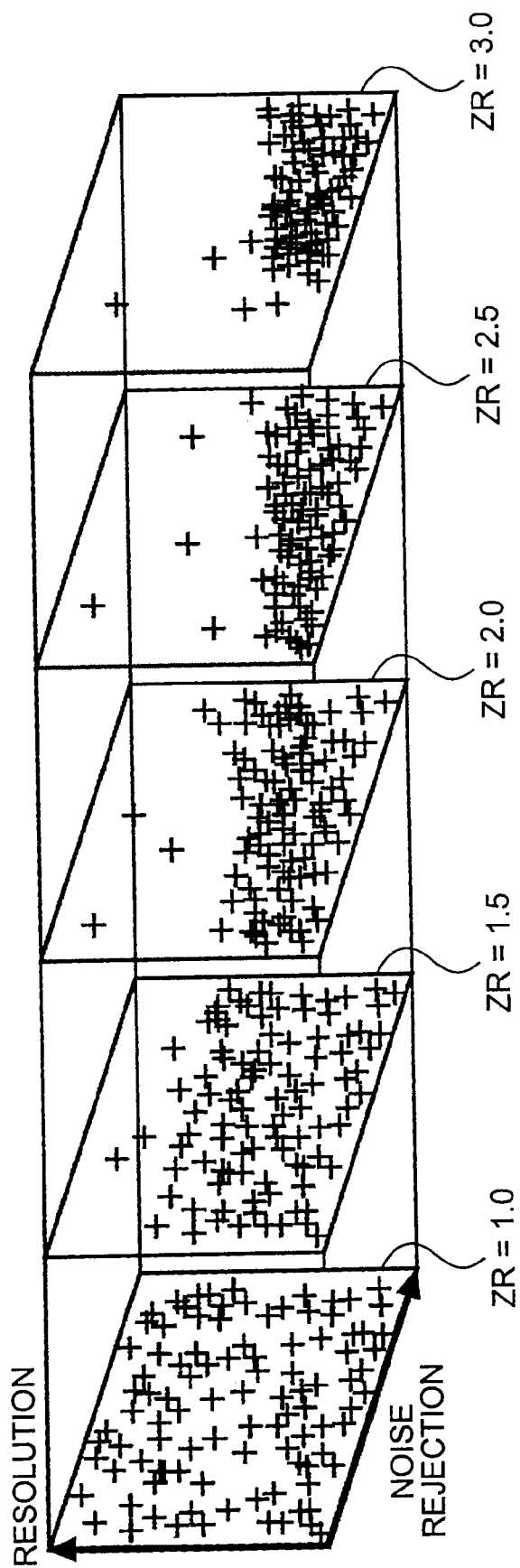
FIG. 14 is an illustration for explaining a preference space.
Figure 15:
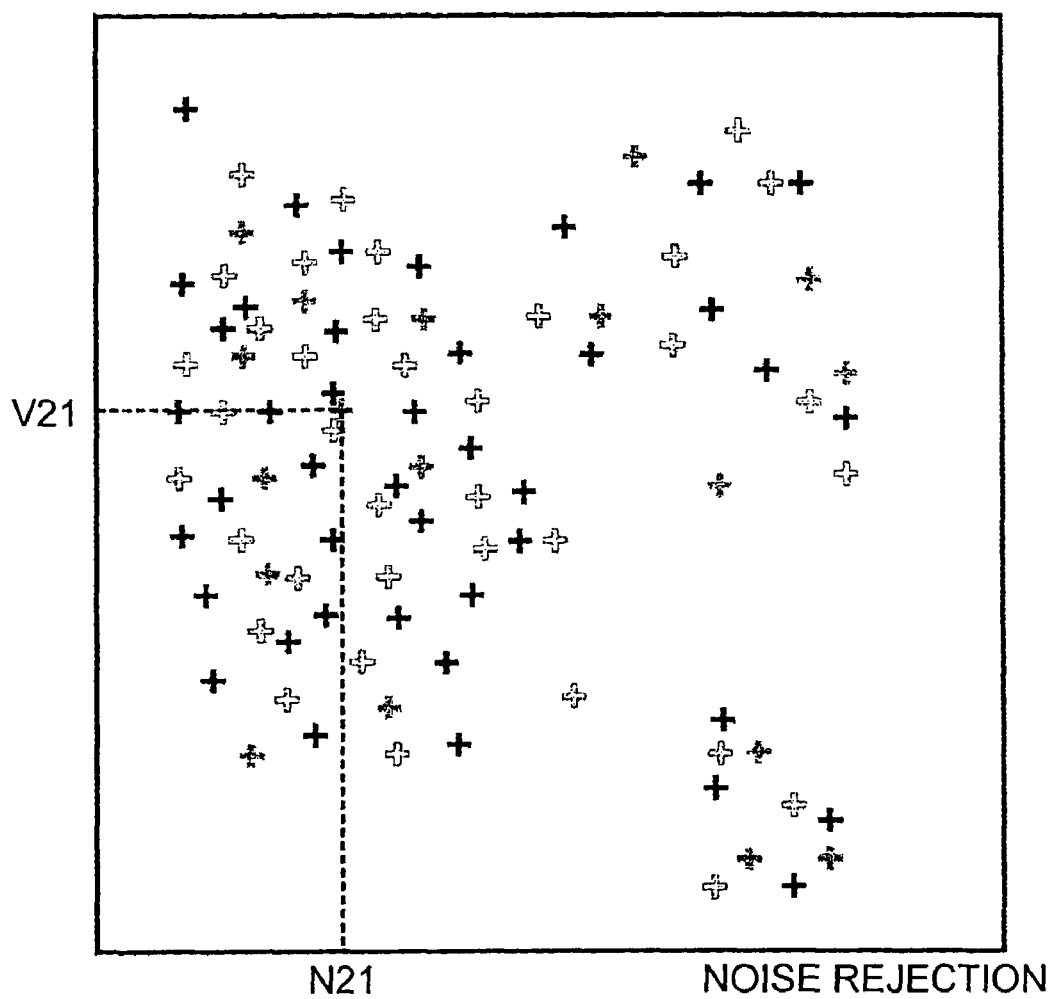
FIG. 15 is an illustration for explaining processing for calculating optimal values in step S261 in FIG. 13.

In step S261, the optimal value calculation portion 204 calculates optimal values of preference data for the current zoom factor. For example, as shown in FIG. 14, data of noise rejections and resolutions (preference data) previously set by the user when the zoom factor ZR is 1.0, 1.5, 2.0, 2.5, and 3.0 is acquired. Coordinates represented by "+" in FIG. 14 show noise rejections and resolutions actually set by the user. Data for the zoom factor currently set by the user is selected from among data for zoom factors. For example, when the zoom factor ZR currently set by the user is 1.5, data (resolutions and noise rejections) for a zoom factor of 1.5 are selected in step S261. The selected data is shown in FIG. 15.

As described above, each piece of data is weighted based on the date. In the example shown in FIG. 15, data represented in a deeper color is newer data, and data represented in a lighter color is older data. In other words, weighting using a larger coefficient is executed for data represented in a deeper color. The optimal value calculation portion 204 calculates the center of gravity of the data. A coordinate point of the resolution at the center of gravity is regarded as a prediction value (optimal value) of resolution, and a coordinate point of the noise rejection at the center of gravity is regarded as a prediction value (optimal value) of noise rejection. In the example shown in FIG. 15, the prediction value of resolution is V21, and the prediction value of noise rejection is N21.

As described above, although the processing for prediction procedure 1 uses a primary approximate line for calculating optimal values, the processing for prediction procedure 2 does not use a primary approximate line used for prediction procedure 1 since optimal values for the zoom factor currently set by the user are calculated in prediction procedure 2. Thus, if a square error between a primary approximate line and preference data for each zoom factor is more than or equal to the threshold value TH, more accurate optimal values can be calculated by prediction procedure 2.

In step S263, the adjustable range calculation portion 205 calculates an adjustable range of a preference space (a possible range of user inputs) centered on the optimal values.

Figure 16:
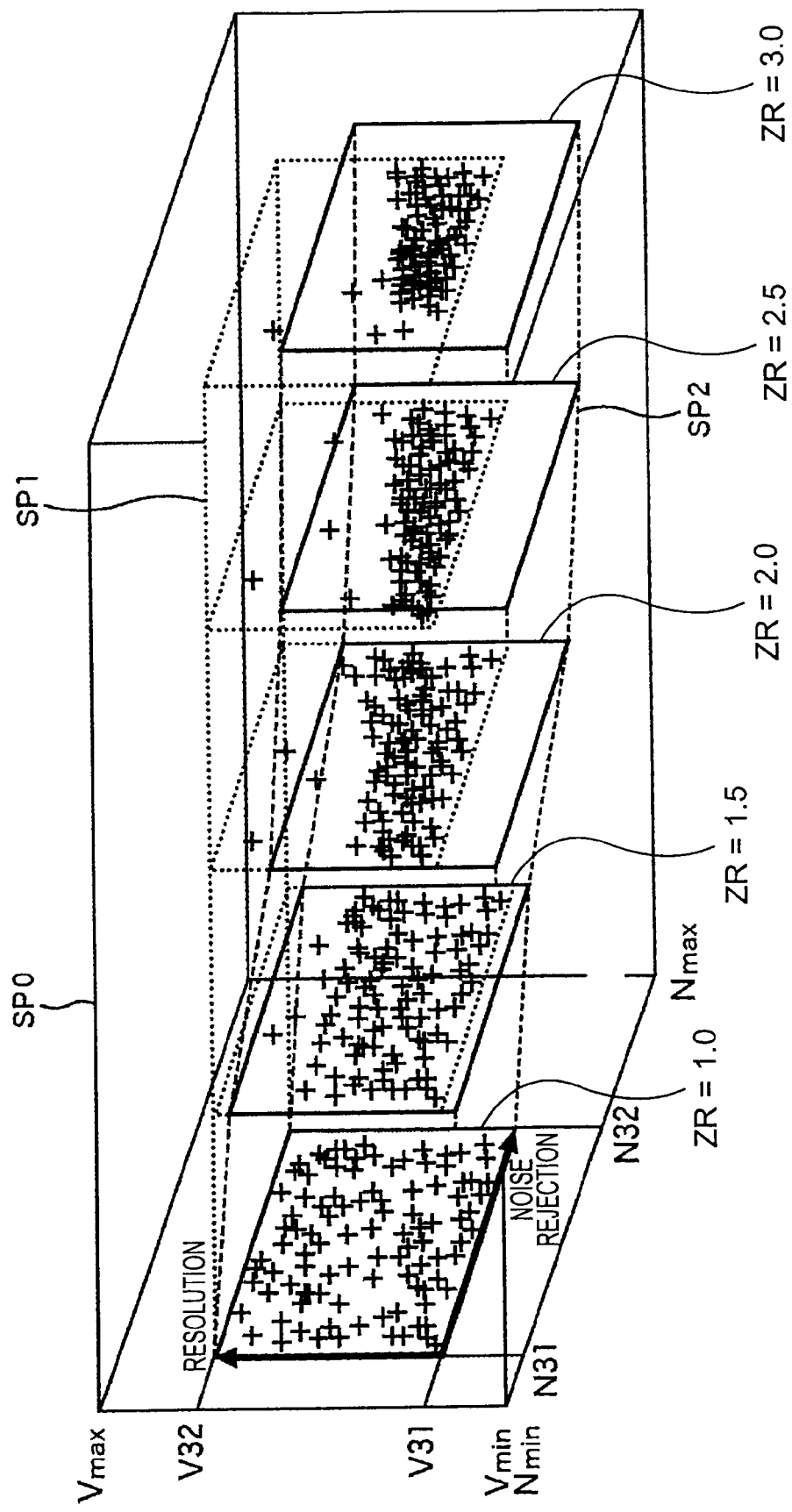
FIG. 16 is an illustration for explaining an adjustable range of the preference space in step S262 in FIG. 13.

In other words, as shown in FIG. 16, normally, adjustable ranges of noise rejection and resolution are fixed. That is, when the zoom factor ZR is 1.0, 1.5, 2.0, 2.5, or 3.0, the adjustable range of noise rejection is between N31 to N32 and the adjustable range of resolution is between V31 and V32. This means that a preference space is fixed to a preference space SP1 in which noise rejection is between N31 and N32 and resolution is between V31 and V32.

In the example shown in FIG. 16, a noise rejection is likely to increase and a resolution is likely to decrease in accordance with an increase in the zoom factor ZR. As a result, an adjustable range for user setting is practically reduced. In other words, a noise rejection exceeding the noise rejection N32 cannot be set by the user, and a resolution lower than the resolution V31 cannot be set by the user. For a large zoom factor ZR, it is not likely to reduce a noise rejection or to increase a resolution. Thus, setting a small adjustable range for noise rejection or setting a large adjustable range for resolution simply reduces the utilization efficiency, and actually, there is not much point in setting such an adjustable range. In other words, for a large zoom factor ZR, the user can set only an extremely narrow adjustable range.

In this embodiment, the user can set a substantially wide adjustable range even for a large zoom factor.

The adjustable range calculation portion 205 acquires a range as an adjustable range in which the optimal values calculated in step S261 for each zoom factor are located at the approximate center of the adjustable range. In FIG. 16, the dotted lines represent the fixed preference space SP1, and the broken lines represent a preference space SP2 defined by the adjustable range calculated such that optimal values for each zoom factor are located at the center of the adjustable range.

In step S263, the determination portion 206 determines whether or not the calculated preference space is within the maximum preference space prepared in advance. The maximum preference space is represented by a preference space SP0 in FIG. 16. The preference space SP0 is the maximum range prepared as an adjustable range in the image processing apparatus 51. More specifically, the preference space SP0 is a space in which noise rejection is adjustable within a range between a minimum noise rejection Nmin and a maximum noise rejection Nmax and in which resolution is adjustable within a range between a minimum resolution Vmin and a maximum resolution Vmax. If at least part of the adjustable range calculated in step S262 is located outside the maximum adjustable preference space, adjustment is not physically performed for the part outside the maximum preference space. Thus, if it is determined that the preference space calculated in step S262 is located outside the maximum preference space prepared in advance, the correction portion 207 corrects the adjustable range so as to be accommodated within the maximum preference space in step S264. In other words, the maximum value and the minimum value of the adjustable range of noise rejection are limited to the maximum noise rejection Nmax and the minimum noise rejection Nmin, and the maximum value and the minimum value of the adjustable range of resolution are limited to the maximum resolution Vmax and the minimum resolution Vmin.

In step S265, the adjusting portion 208 adjusts the adjustable range of the preference space. More specifically, if the adjustable range is corrected in step S264, the corrected range is set as an adjustable range. In contrast, if it is determined in step S263 that the calculated preference space is within the prepared maximum preference space, the adjustable range calculated in step S262 is set as an adjustable range.

Figure 17:
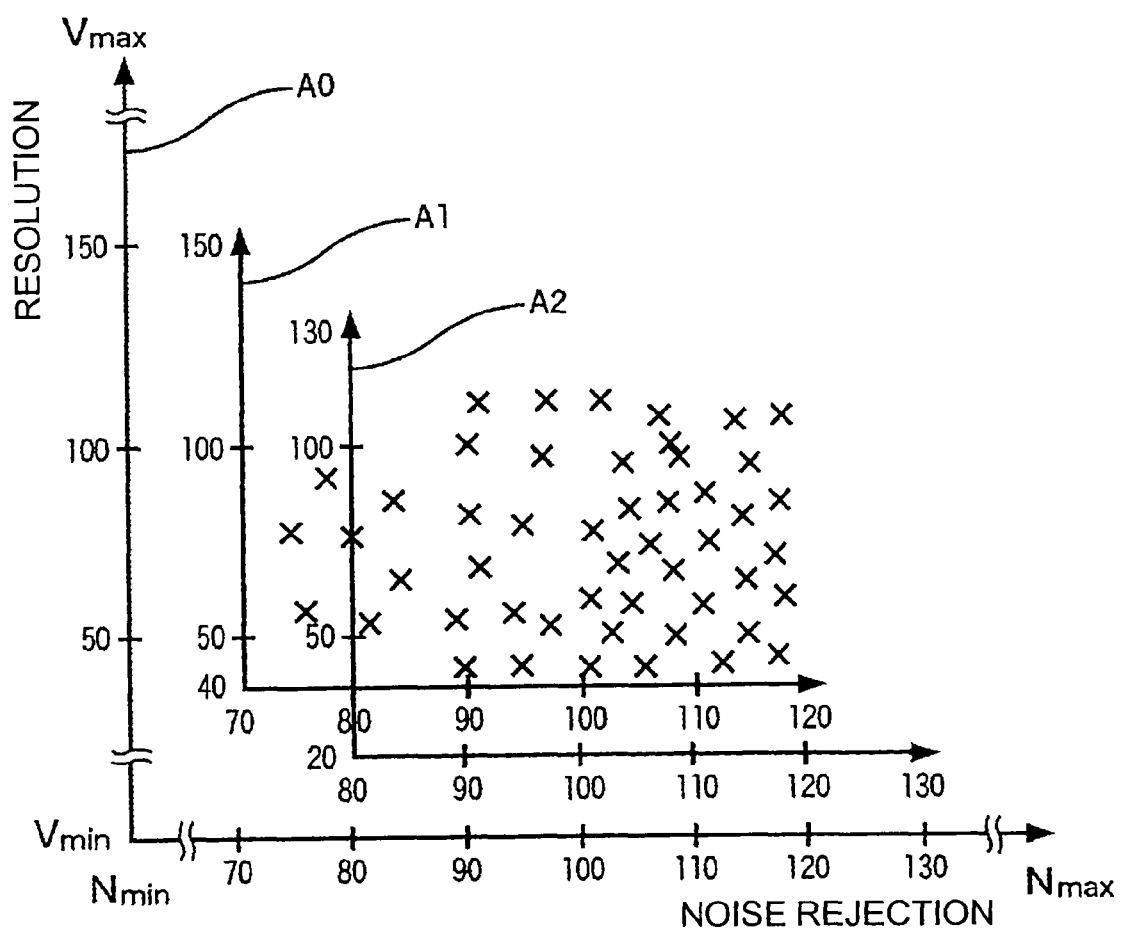
FIG. 17 is an illustration for explaining adjustment of the adjustable range in step S265 in FIG. 13.

For example, as shown in FIG. 17, coordinate axes A0 represents an adjustable range of the maximum preference space SP0 in which noise rejection is adjustable within a range between the minimum noise range Nmin and the maximum noise range Nmax and resolution is adjustable within a range between the minimum resolution range Vmin and the maximum resolution range Vmax. Coordinate axes A1 represents a preference space in which noise rejection is adjustable within a range between 70 and 120 and resolution is adjustable within a range between 40 and 150. When the user adjusts noise rejection and resolution within the preference space represented by the coordinate axes A1 within the coordinate axes A0, if the center of gravity of adjusted values is shifted from the center of the coordinate axes A1, a preference space SP2 as an adjustable range represented by new coordinate axes A2 centered on the center of gravity is set. For the coordinate axes A2, noise rejection is adjustable within a range between 80 and 130, and resolution is adjustable within a range between 20 and 130.

Thus, a larger noise rejection can be adjusted and a lower resolution can be adjusted compared with a case for the coordinate axes A1. Thus, the user is able to set a noise rejection and a resolution suited for a user's preference quickly and accurately.

In general, an adjustable range is initially set to the maximum preference space SP0. In this case, the adjustable range of noise rejection is set between the minimum noise rejection Nmin and the maximum noise rejection Nmax and the adjustable range of resolution is set between the minimum resolution range Vmin and the maximum resolution Vmax. However, in this case, it is difficult to quickly set an adjusted value desired by the user since the adjustable range is too wide. Thus, setting part of the maximum adjustable range as an adjustable range for that time allows the user to set an adjusted value desired by the user quickly and accurately.

The adjustable range may be changed from the coordinate axes A1 to the coordinate axes A2 every time the user sets an adjusted value. Alternatively, the change in the adjustable range may be performed every time a predetermined number of setting operations are performed.

Such an adjusting method is not necessarily applied to image adjustment. Such an adjusting method may be applied to adjustment of an output state of other types of information, such as sound.

Figure 18:
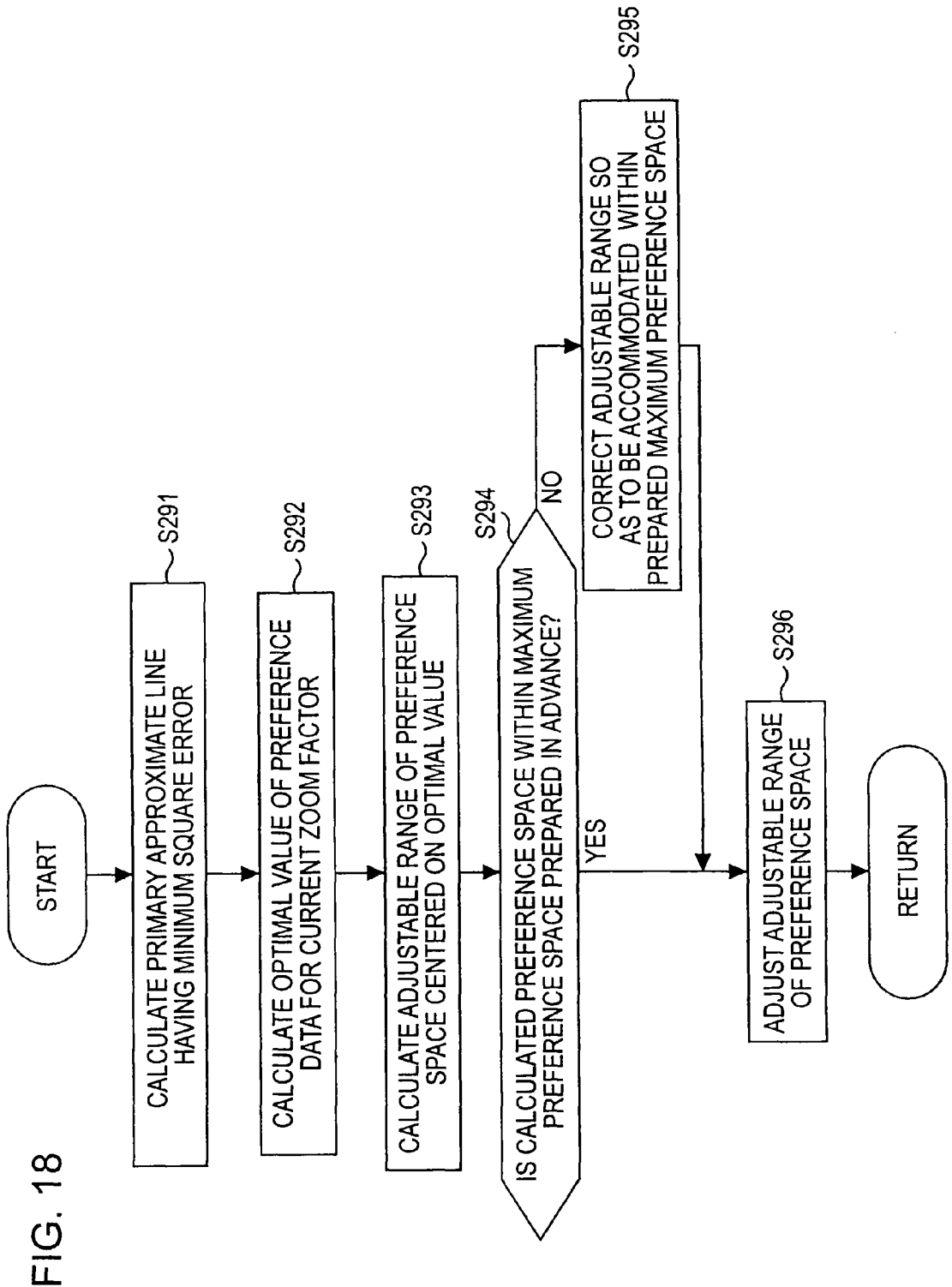
FIG. 18 is a flowchart of a process of prediction procedure 3 in step S117 in FIG. 13.

The process of prediction procedure 3 is shown in details in FIG. 18. The basic processing of prediction procedure 3 is similar to the processing in steps S261 to S265 for prediction procedure 2 in FIG. 13. However, in step S261 in FIG. 13, optimal values of preference data for the current zoom factor are calculated based on values of the center of gravity for the current zoom factor, as shown in FIG. 15. In contrast, in the processing for prediction procedure 3 in FIG. 18, in step S291, a primary approximate line having the minimum square error is calculated by the approximate line calculation portion 203. Then, in step S292, the optimal value calculation portion 204 calculates optimal values of preference data for the current zoom factor in accordance with the primary approximate line calculated in step S291. In other words, processing similar to the processing in steps S231 and S232 in FIG. 10 is performed in steps S291 and S292.

Figure 13:
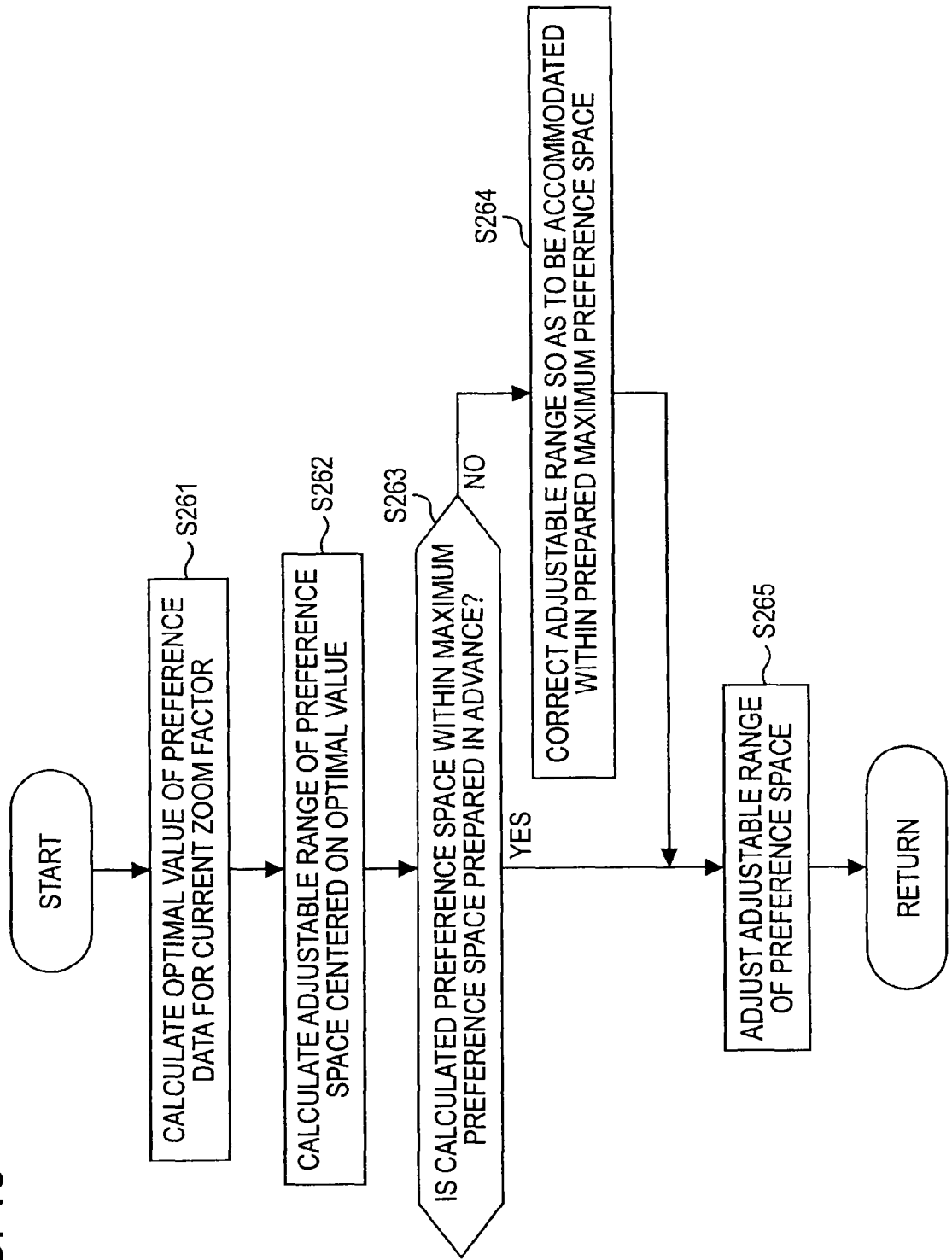
FIG. 13 is a flowchart of a process of prediction procedure 2 in step S119 in FIG. 9.

Then, processing similar to the processing in steps S262 to S265 in FIG. 13 is performed in steps S293 to S296.

In other words, in the processing for prediction procedure 3, optimal values are calculated based on a primary approximate line, and an adjustable range is set so as to be centered on the optimal values.

In the above description after the predetermined portion, the total sum of square errors has been referred to as a square error.

Figure 19:
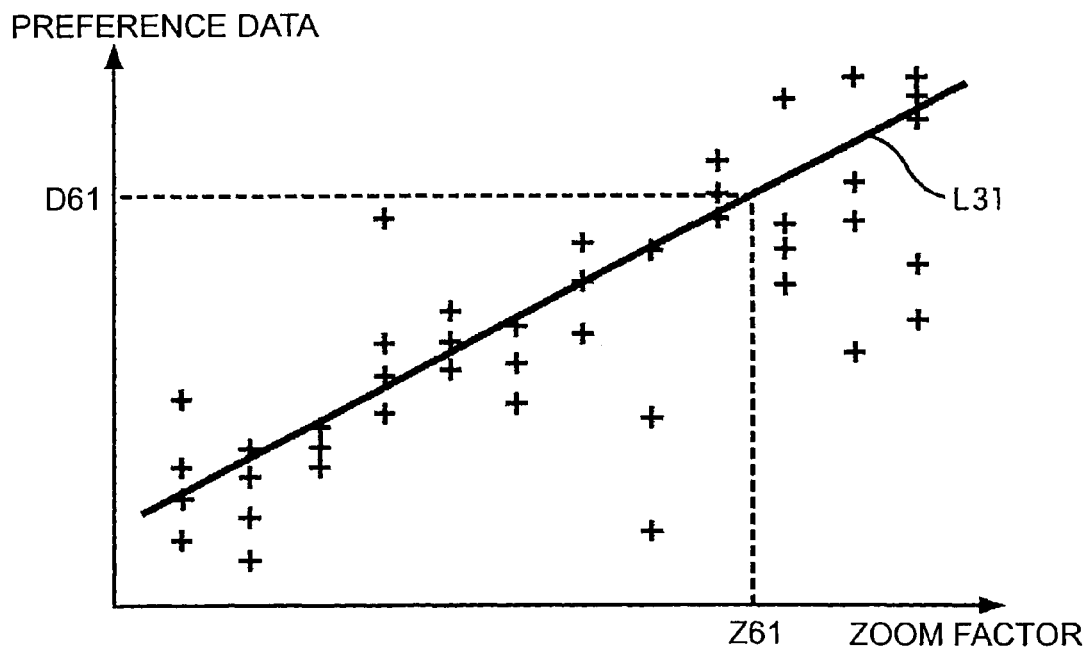
FIG. 19 is an illustration for explaining a primary approximate line.

Although two pieces of data, that is, noise rejection and resolution, are used as preference data corresponding to a predetermined zoom factor in the foregoing processing, only one piece of preference data may exist. In this case, for example, as shown in FIG. 19, in a coordinate space defined by a zoom factor and a piece of preference data, preference data corresponding to the current zoom factor Z61 may be obtained as an optimal value D61 in accordance with a primary approximate line L31 having the minimum total sum of square errors.

In addition, although the total sum of square errors is used for comparing with the threshold value TH in the foregoing processing, the total sum of square errors is not necessarily used for comparison. A value based on the total sum of square errors, such as a value obtained by dividing the total sum by a predetermined number (for example, a value obtained by dividing the total sum by the number of pieces of preference data) or a value normalized so as to be accommodated within a predetermined range in consideration of the number of pieces of preference data, may be used. In this case, processing similar to the foregoing processing is performed with the exception that a value based on the total sum of square errors (from the predetermined portion until the description with reference to FIG. 18, simply referred to as a square error), instead of the total sum of the square errors, is read for comparing with the threshold value TH. In other words, from the predetermined portion until the description with reference to FIG. 18, the total sum of square errors or a value based on the total sum of the square errors used for comparing with the threshold value TH is simply described as a square error.

In addition, in a case where a value based on the total sum of square errors is used, the threshold value TH may be changed in accordance with the number of pieces of accumulated preference data.

Figure 20:
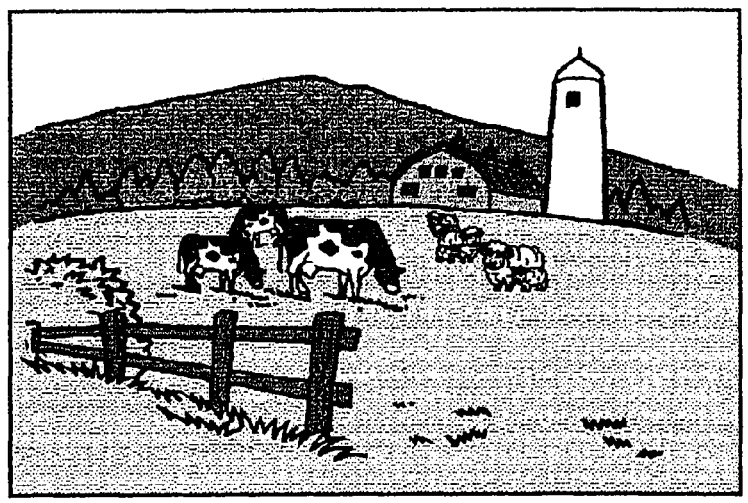
FIG. 20 shows an example of an input image.
Figure 21A:
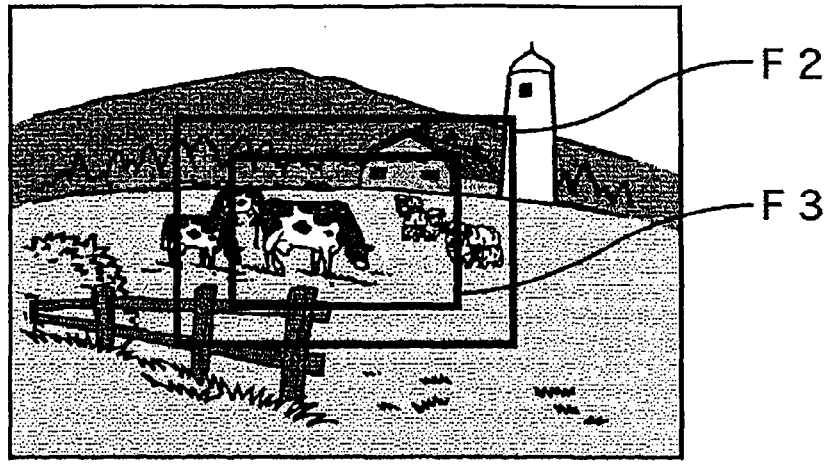
FIG. 21A shows an example of an output image with a 1× zoom factor.
Figure 21B:
FIG. 21B shows an example of an output image with a 2× zoom factor.
Figure 21C:
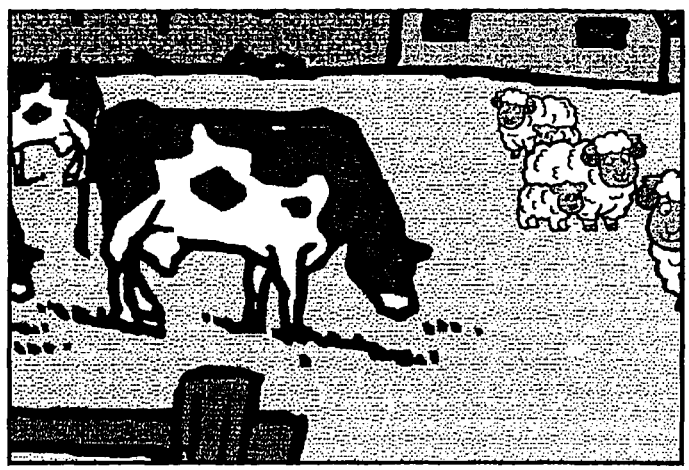
FIG. 21C shows an example of an output image with a 3× zoom factor.

As a result of the foregoing processing, for example, when an image shown in FIG. 20 is received via the television tuner 61 in the image processing apparatus 51, if the user sets a 1× zoom factor, a 2× zoom factor, or a 3× zoom factor, an image shown in FIG. 21A, FIG. 21B, or FIG. 21C is displayed on the monitor 66. In other words, when the user sets the 2× zoom factor, an image with 2× zoom of a field angle F2 in FIG. 21A is magnified and displayed as shown in FIG. 21B. When the user sets the 3× zoom factor, an image with 3× zoom of a field angle F3 in FIG. 21A is magnified and displayed as shown in FIG. 21C.

Figure 22A:
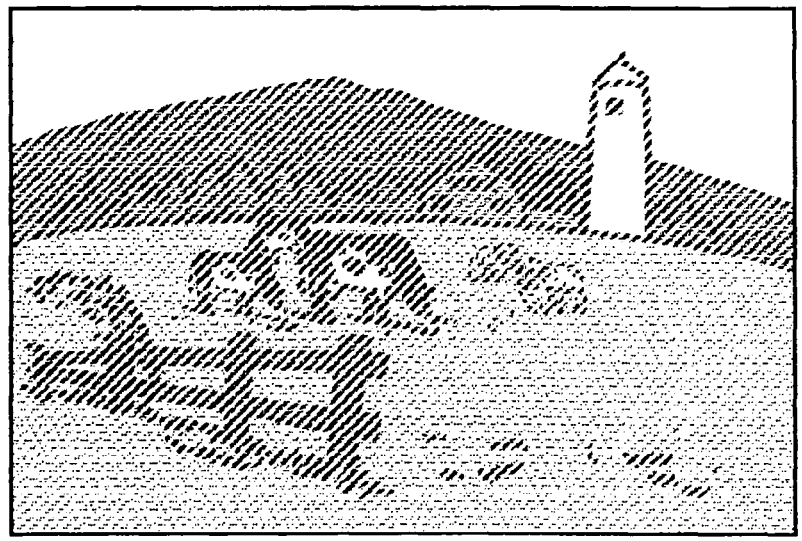
FIG. 22A shows an example of an output image with a relatively low resolution.
Figure 22B:
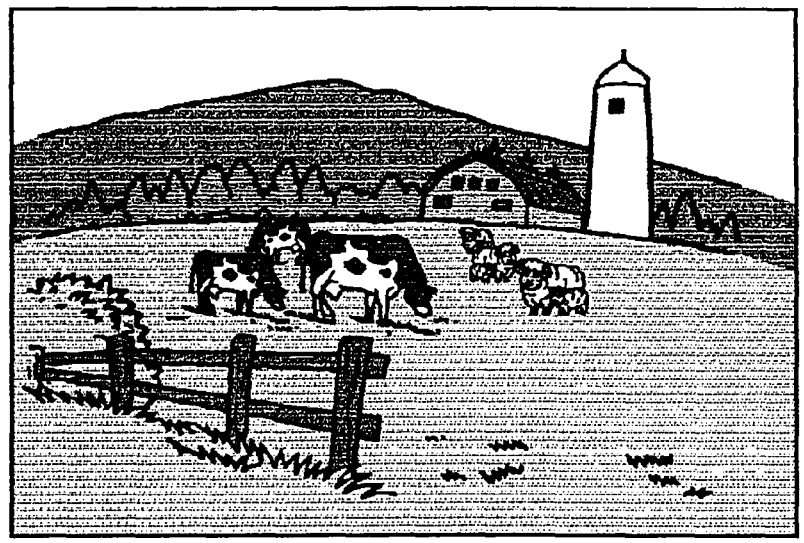
FIG. 22B shows an example of an output image with a higher resolution.

For example, optimal values of resolution and noise rejection when the user designates a 1× zoom factor are predicted based on records of adjustment by the user. An image based on time resolution processing using the optimal resolution and noise rejection is displayed, for example, as shown in FIG. 22A or FIG. 22B. FIG. 22A shows an image when a relatively low resolution is set, and FIG. 22B shows an image when a higher resolution is set.

The foregoing series of processing may be performed by hardware or software. If the foregoing series of processing are performed by software, a program constituting the software is installed from a network or a recording medium on a computer installed in dedicated hardware or, for example, a general-purpose personal computer that is capable of performing various functions by installing various programs.

The recording medium not only includes the removable medium 69, such as a magnetic disk (including a floppy disk), an optical disk (including a compact disk-read only memory (CD-ROM) or a DVD), a magneto-optical disk (including a MiniDisk (MD)), or a semiconductor memory, which records the program and is distributed in order to provide the program to a user independent of the apparatus main unit, but also includes a ROM or a hard disk which records the program and is built in the apparatus main unit to be provided to the user, as shown in FIG. 2.

In this specification, steps for the program recorded in the recording medium are not necessarily performed in chronological order in accordance with the written order. The steps may be performed in parallel or independently without being performed in chronological order.

In addition, in this specification, the term "system" represents the entire apparatus constituted by a plurality of apparatuses.

According to the embodiments of the present invention, an image with an image quality suited for a user's preference can be provided. In particular, according to the present invention, an image with an image quality desired by the user can be provided with a zoom factor designated by the user.

In addition, according to the embodiments of the present invention, an output state of information can be adjusted. In particular, according to the present invention, an output state desired by the user can be adjusted easily, accurately, and quickly.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
  a storage device configured to store an adjusted value previously set by a user for an output state of information; and
  a prediction device configured to predict a prediction value for adjustment of the output state in accordance with the stored adjusted value, wherein
  the storage device stores the adjusted value previously set by the user for each of a zoom factor and an image quality of an image,
  when the user designates a zoom factor, the prediction device predicts the prediction value for adjustment of the image quality corresponding to the designated zoom factor in accordance with the stored adjusted value, and
  the setting device sets the designated zoom factor and the prediction value.

2. The information processing apparatus according to claim 1, wherein the prediction device predicts the prediction value by weighting the previously set adjusted value on the basis of a date.

3. The information processing apparatus according to claim 1, wherein the prediction device predicts the prediction value based on a primary approximate line in which the total sum of square errors with respect to adjusted values previously set by the user is the minimum.

4. The information processing apparatus according to claim 1, further comprising:
  an adjusting device configured to adjust an adjustable range for the image quality such that the prediction value is located at the approximate center of the adjustable range.

5. The information processing apparatus according to claim 4, wherein,
  the storage device stores a first adjusted value and a second adjusted value as adjusted values of the image quality,
  the prediction device predicts a prediction value of the first adjusted value and a prediction value of the second adjusted value corresponding to the designated zoom factor, and
  the adjusting device adjusts the adjustable range for the image quality such that the prediction value of the first adjusted value is located at the approximate center of the adjustable range and that the prediction value of the second adjusted value is located at the approximate center of the adjusted range.

6. The information processing apparatus according to claim 5, wherein the first adjusted value and the second adjusted value are a resolution and a degree of noise rejection, respectively, for resolution creation processing.

7. An information processing method comprising:
storing an adjusted value previously set by a user for an output state of information;
predicting a prediction value for the adjusted value; and
setting a designated zoom factor and the prediction value, wherein
the adjusted value previously set by the user for each of a zoom factor and an image quality of an image is stored during the storing, and
when the user designates the zoom factor, the prediction value for adjustment of the image quality corresponding to the designated zoom factor is predicted by the predicting in accordance with the stored adjusted value.

8. An information processing apparatus comprising:
storage means for storing an adjusted value previously set by a user for an output state of information; and
prediction means for predicting a prediction value for adjustment of the output state in accordance with the stored adjusted value, wherein
the storage means stores the adjusted value previously set by the user for each of a zoom factor and an image quality of an image,
when the user designates a zoom factor, the prediction means predicts the prediction value for adjusting of the image quality corresponding to the designated zoom factor in accordance with the stored adjusted value, and
the setting means sets the designated zoom factor and the prediction value.

* * * * *